US007277643B2

United States Patent
Baba et al.

(10) Patent No.: US 7,277,643 B2
(45) Date of Patent: Oct. 2, 2007

(54) CLOCK EXTRACTING FABRIC IN A COMMUNICATION DEVICE

(75) Inventors: Takashige Baba, Kodaira (JP); Tatsuya Saito, Kunitachi (JP); Masayoshi Yagyu, Hanno (JP); Shigeo Oomae, Hadano (JP)

(73) Assignee: Hitachi, Ltd., Tokyo (JP)

( * ) Notice: Subject to any disclaimer, the term of this patent is extended or adjusted under 35 U.S.C. 154(b) by 702 days.

(21) Appl. No.: 10/629,755

(22) Filed: Jul. 30, 2003

(65) Prior Publication Data

US 2004/0109476 A1   Jun. 10, 2004

(30) Foreign Application Priority Data

Dec. 9, 2002   (JP)   .............................. 2002-357125

(51) Int. Cl.
*H04B 10/00* (2006.01)
*H04L 27/00* (2006.01)
*H04L 12/50* (2006.01)
*H04J 3/06* (2006.01)

(52) U.S. Cl. .................... 398/155; 398/154; 398/156; 375/324; 375/373; 375/355; 375/371; 375/376; 370/503; 370/357

(58) Field of Classification Search ................ 398/155, 398/154, 156; 375/324, 355, 371, 373, 376; 370/503, 357
See application file for complete search history.

(56) References Cited

U.S. PATENT DOCUMENTS 6,836,522 B1 * 12/2004 Wakayama ................. 375/376

7,039,323 B2 * 5/2006 Jong et al. ................. 398/155
2002/0167897 A1 * 11/2002 Tateno et al. ............... 370/216

FOREIGN PATENT DOCUMENTS

JP   2001-44974   7/1999

OTHER PUBLICATIONS

"Maxim, Quad 2.5Gbps Cable Transceiver", Maxim Integrated Products, 2001, pp. 1-19.

* cited by examiner

*Primary Examiner*—Kenneth Vanderpuye
*Assistant Examiner*—Ken Malkowski
(74) *Attorney, Agent, or Firm*—Reed Smith LLP; Stanley P. Fisher, Esq.; Juan Carlos A. Marquez, Esq.

(57) ABSTRACT

A signal communication apparatus of a clock reproduction system in which clock signals are extracted from each of parallel data signals for redigitizing each of the data signals. The apparatus includes a reference clock signal generating circuit which is comprised of a clock extraction circuit for extracting a clock signal from each of a plurality of bits of received data signals, and a clock signal selection circuit for selecting one of the extracted clock signals. Alternatively, the reference clock signal generating circuit may be comprised of a data signal selection circuit for selecting one of a plurality of received data signals, and a clock extraction circuit for extracting a clock signal from the selected bit. Based on the resultant reference clock signal, clock signals are obtained that are phase-adjusted for redigitizing each bit of the received data signals. The selection made in the selection circuit is switched on the basis of the output of a clock signal monitoring circuit that detects the occurrence of abnormalities in the frequency of the extracted clock signal. Thus, the extraction of clock can be continued using other bits in the event of an abnormality in the bit from which the clock is being extracted.

11 Claims, 16 Drawing Sheets

CLOCK EXTRACTING FABRIC IN A COMMUNICATION DEVICE

This application is based on the Japanese Patent application, 2002-357125, filed on Dec. 9, 2002, all the contents of which are incorporated in this application by reference.

BACKGROUND OF THE INVENTION

1. Field of the Invention

The present invention relates to multibit signal communication apparatuses using optical or electric signals, and to clock signal reproduction transmission systems for extracting a clock signal for redigitizing data signals that have been transmitted. In particular, the invention relates to techniques for ensuring reliability in the event an abnormality develops in some of the bits in the data signals by allowing communication to continue using the remaining normal bits.

2. Background Art

Information processing apparatuses such as switching systems and routers employ an optical or electric signal communication apparatus for carrying out data communications. In a receiver portion of such a signal communication apparatus, it is necessary to render a reception data signal into a digital signal synchronized with the internal clock signal of the apparatus so that signal processing can be carried out in the apparatus. For this purpose, in the receiver portion of the signal communication apparatus in general, a step is carried out before synchronizing the data signal with the internal clock signal whereby a clock signal with an adjusted phase relationship with the data signal and the data signal are fed to a flip-flop circuit to reproduce a data signal synchronized with the clock signal. This clock signal is referred to as a reproduction clock signal. The data signal synchronized with the reproduction clock signal can be easily synchronized with the internal clock signal by digital processing such as phase adjustment or demultiplexing.

JP Patent Publication (Kokai) No. 2001-44974 A discloses an apparatus comprising an N-transmission line interface panel that accommodates individual transmission paths for N-lines and that extracts a clock signal from each of reception data signals. The apparatus also comprises a clock signal distribution panel for producing an internal clock signal and a transmission-path interface panel that constitutes a preliminary package. The clock signal distribution panel has an active line state monitoring circuit. The transmission-path interface panel includes a clock signal extraction circuit, an extraction-reference clock signal generation circuit, a clock signal control circuit, and a state-signal selection circuit. The extracted clock signal is phase-adjusted so as to be synchronized with the internal clock signal.

When the communication speed is relatively low, a clock signal parallel transmission system is used whereby the clock signal that has been transmitted simultaneously and in parallel with data signal is used as the reproduction clock signal. However, when the communication speed is more than 1 Gbps, the clock signal parallel transmission system produces large timing variations between the data signal and the clock signal, known as "bit skew", so that the parallely transmitted clock signal cannot be used as the reproduction clock signal as is. Thus, in high-speed signal communications, a clock signal reproduction transmission system is employed. In this system, instead of transmitting the clock signal in parallel with the data signal, a clock signal is extracted from the data signal by means of a phase-locked oscillator, for example. The clock signal is then used as the reproduction clock signal.

In recent years, a multibit clock signal reproduction transmission system is increasingly used in which the number of signal bits between signal communication apparatuses is increased in order to further increase the transmission speed. An example where such a multibit clock signal reproduction transmission system is applied to an IC for cable transceivers is described in the MAXIM product catalog, Quad 2.5 Gbps Cable Transceiver MAX3780, available from Maxim Integrated Products.

Referring to FIG. 14, the structure of the signal communication apparatus using the clock signal reproduction transmission system according to the prior art will be described. As shown in FIG. 14, numeral 1401 designates a signal communication apparatus A that transmits an n-bit (where n is an integer greater than 1) data signal. Numeral 1402 designates a signal communication apparatus B that receives the n-bit data signal transmitted from the signal communication apparatus A 1401. Numeral 1403 in the signal communication apparatus A 1401 designates an internal circuit that outputs n-bit data signals Tid1, Tid2, Tid3, . . . Tidn. Numerals 14041, 14042, 14043, . . . 1404$n$ designate output buffer circuits. Numerals 14051, 14052, 14053, . . . 1405$n$ designate transmission lines, such as optical fibers or conductor cables, connecting the apparatus A 1401 and the apparatus B 1402.

Data signals Tid1, Tid2, Tid3, . . . Tidn are outputted via output buffer circuits 14041, 14042, 14043, . . . 1404$n$ to the transmission lines 14051, 14052, 14053, . . . 1405$n$ in the form of optical or electric signals, for example. The n-bit data signals transmitted via the transmission lines are received by input buffer circuits 14061, 14062, 14063, . . . 1406$n$ in the signal communication apparatus B 1402. The input buffer circuits then output n-bit data signals Txd1, Txd2, Txd3, . . . Txdn. The signal communication apparatus B 1402 further includes a clock signal reproduction circuit 1407 and phase adjusting circuits 14081, 14082, 14083, . . . 1408$n$ as circuits for reproducing the data signal. The clock signal reproduction circuit 1407 extracts a reference clock signal SCK from the data signal Txd1. In the phase adjusting circuits 14081, 14082, 14083, . . . 1408$n$, the phase of the individual data signals Txd1, Txd2, Txd3, . . . Txdn is compared with that of the reference clock signal SCK to produce phase-adjusted reproduction clock signals RCK1, RCK2, RCK3, . . . RCKn for the correct reproduction of a data signal.

Using the data signals Txd1, Txd2, Txd3, . . . Txdn and the reproduction clock signals RCK1, RCK2, RCK3, . . . RCKn, the flip-flop circuits 14091, 14092, 14093, . . . 1409$n$ outputs data signals Tod1, Tod2, Tod3, . . . Todn, which are synchronized with the reproduction clock signal. The data signals Tod1, Tod2, Tod3, . . . Todn synchronized with the reproduction clock signals are received by an internal circuit 1410.

Thus, the apparatus shown in FIG. 14 is a signal communication apparatus employing the clock signal reproduction transmission system whereby a clock signal is extracted from the data signal Txd1 and then an n-bit data signal is reproduced using the extracted clock signal as the reference clock signal.

In the above-mentioned JP Patent Publication (Kokai) No. 2001-44974 A, the apparatus comprises an N-transmission line interface panel that accommodates individual transmission paths for N-lines and that extracts a clock signal from each of reception data signals. It also comprises a clock signal distribution panel for producing an internal clock signal and a transmission-path interface panel that constitutes a preliminary package. The clock signal distribution panel has an active line state monitoring circuit, and the transmission-path interface panel includes a clock signal extraction circuit, an extraction-reference clock generation circuit, a clock signal control circuit, and a state-signal selection circuit. The extracted clock signal is phase-adjusted so as to be synchronized with the internal clock signal. This circuit apparatus synchronizes the extracted clock signal with the internal clock and then retains it as a standby clock. It does not use the extracted clock signal for the redigitization of a data signal.

In the conventional signal communication apparatus shown in FIG. 14, in case an abnormality develops in the data signal Txd1 from which the reference clock signal SCK is to be extracted, the reference clock signal SCK cannot be extracted. As a result, it would become impossible to produce the reproduction clock signals based on the reference clock signal in all of the bits. Then, it would become impossible to conduct all-bit signal communications even if the data signals Txd2, Txd3, . . . Txdn for bits other than that of the data signal Txd1 are normal. If a defect were to instantaneously disable signal communication, the participants in the communication would suffer greatly. Communication failure must therefore be responded to immediately by replacing the affected signal communication apparatus, but it is impossible to provide planned restoration work. Thus, it is costly to manage and maintain the signal communication apparatuses.

In order to prevent such a signal communication interruption in times of failure, the signal communication apparatuses could be provided in a dual manner. According to this method, should a failure occur in one of the signal communication apparatuses, the other signal communication apparatus can be operated so that no signal communication interruption occurs during failure. In this method, the number of bits available in the event of failure is 50% of that available during normal operation. However, the cost per bit of data signal increases with increasing transmission speed, and so the dual provision of signal communication apparatuses is disadvantageous in terms of cost.

In another method for preventing the interruption of signal communication in the event of failure, each bit of the data signals could be provided with a clock signal reproduction circuit so that the clock signal can be extracted for each bit. In this method, if failure occurs in one bit of a data signal, clock signals can be obtained from the other bits and the reproduction clock signals can be produced. The available bits during failure in this method are $(n-1)/n \times 100\%$ of the bits available during normal operation, where n is the number of bits in the data signal and is an integer greater than 1. In recent years, however, it is becoming increasingly common to mount a multibit data signal communication reception circuit on a single LSI chip. Thus, when the data signal has n bits, a number n of clock signal reproduction circuits must be provided for the single LSI chip. As the clock signal reproduction circuit has a larger area than that of other reception circuits such as signal input circuits, the required area of the LSI becomes greater and the cost increases. In general, the clock signal reproduction circuit employs a phase synchronizing circuit that tends to become the source of noise, which destabilizes the operation. Accordingly, mounting many clock signal reproduction circuits on a single LSI chip creates the problem of noise between clock signal reproduction circuits, which is difficult to solve in terms of LSI development.

Particularly in signal communication apparatuses that employ light, where an oscillator for producing light is provided for each bit, failure whereby one bit of data signal develops an abnormality occurs relatively often, and it is very important to provide countermeasures.

SUMMARY OF THE INVENTION

It is an object of the invention to provide a signal communication apparatus and signal communication system in which the number of clock signal reproduction circuits, which is a main factor contributing to the difficulty of LSI development, is minimized. In the signal communication apparatus and signal communication system, failure concerning the development of an abnormality in one bit does not result in data communication interruption, and the available bits in the event of failure are maximized at $(n-1)/n \times 100\%$ of the bits available during normal operation.

In one aspect, the invention provides a signal communication apparatus of the clock reproduction transmission type. In this apparatus, communication is conducted using optical or electric signals of bits with a degree n of parallelism (where n is an integer greater than 1). Clock signals extracted from the communicated data signals are used as reproduction clock signals for redigitizing the data signals. The signal communication apparatus includes a data signal reception section for receiving n-bit data signals. The data signal reception section includes a clock signal extraction/selection circuit to which a number a of bits of the n-bit data signals (where a is an integer such that $2 \leq a < n$) are fed. The clock signal extraction/selection circuit selects a number b of bits from the a bits (where b is an integer such that $1 \leq b \leq a$) and outputs them as reference clock signals to be used as the basis of the reproduction clock signal. The data signal reception section also includes a number n of phase adjusting circuits provided for each of the n-bit data signals for adjusting the timings of the reference clock signals and the data signals. The phase adjusting circuits produce a reproduction clock signal for each of the n-bits providing the timing for sampling and redigitizing the data signals.

Thus, in accordance with the signal communication apparatus, the extracted clock signals are provided with an a-1 redundancy. Thus, in case an abnormality develops in the data signal bit being used for the extraction of the reference clock signal such that clock signals cannot be correctly extracted, the data signal bit can be switched to any one of the a-1 clock signals from which the reference clock signal can be correctly extracted.

The invention can provide an optical module apparatus including a first transmission/reception circuit for transmitting or receiving p-bit optical signals (where p is an integer greater than or equal to 1). It also includes a photoelectric conversion circuit for mutually converting optical and electric signals. It further includes a bit-number conversion circuit for mutually converting p-bit and q-bit signals (where q is an integer greater than or equal to 1), and a second transmission/reception circuit for transmitting or receiving q-bit electric signals. At least one of the transmission/reception circuits employs the above-described signal communication apparatus.

The invention can also provide a router apparatus. The apparatus includes a packet signal reception circuit for receiving r-port packet signals (where r is an integer greater than or equal to 1). It also includes a reception packet signal control section for controlling as well as identifying received packet signals, and a switch circuit for connecting receive ports to transmit ports in accordance with a path control signal from the reception packet signal control section. It further includes a transmission packet signal control section for controlling a transmission packet signal, a packet signal transmission circuit for transmitting s-port packet signals (where s is an integer greater than or equal to 1). One or both of the packet signal reception circuit and the packet signal transmission circuit employ(s) the signal communication apparatus according to the invention.

In another aspect, the invention provides a signal communication apparatus of the clock reproduction transmission type. In this apparatus, communication is conducted using optical or electric signals of bits of a degree n of parallelism (where n is an integer greater than 1). Clock signals extracted from the communicated data signals are used as reproduction clock signals for redigitizing the data signals. The signal communication apparatus includes a data signal reception section for receiving n-bit data signals. The data signal reception section includes a clock signal extraction circuit provided for a-bit data signals in n-bit data signals (where a is an integer such that $2 \leqq a < n$) for extracting clock signals from the data signals. The data signal reception section also includes a clock signal selection circuit and a number n of phase adjusting circuits. The clock signal selection circuit selects b bits of the a bits (where b is such an integer such that $1 \leqq b \leqq a$), and distributes b-bit reference clock signals to the n phase adjusting circuits for generating reproduction clock signals. The phase adjusting circuit is provided for each of the n-bit data signals for adjusting the timings of the reference clock signal and the data signals for each bit. Each of the n phase adjusting circuits produces n-bit reproduction clock signals providing the timing of sampling and redigitizing the data signals.

Thus, the timings of the reference clock signal and the data signal for each bit is adjusted by the n phase adjusting circuits provided for each of the n-bit data signals. Each of the phase adjusting circuits produces n-bit reproduction clock signals providing the timing of sampling and redigitizing the data signals. Thus, signal communication can be continued in the event of an abnormality in the data signal of the bit for the extraction of the clock signal, using the remaining bits.

In another aspect, the invention provides a signal communication apparatus of the clock reproduction transmission type. In this apparatus, communication is conducted using optical or electric signals of bits of a degree n of parallelism (where n is an integer greater than 1). Clock signals extracted from the communicated data signals are used as reproduction clock signals for redigitizing the data signals. The signal communication apparatus includes a data signal transmission section including an input circuit and a routing circuit. The input circuit receives a bit routing control signal from the signal communication apparatus to which data signals are transmitted, the bit routing control signal designating normally operable data signal bits and relating to the manner of routing the data signals to each bit. The routing circuit routs the data signals to individual bits based on the bit routing control signal.

In this apparatus, because normally operable data signal bits are determined in the data signal transmission section, signal communication can be conducted by selecting only normal data bits.

In another aspect, the invention provides a signal communication apparatus of the clock reproduction transmission type. In this apparatus, communication is conducted using optical or electric signals of a degree n of parallelism (where n is an integer greater than 1). Clock signals extracted from the communicated data signals are used as reproduction clock signals for redigitizing the data signals. The signal communication apparatus includes a data signal reception section for receiving n-bit data signals. The data signal reception section includes a data signal selection circuit for selecting b bits of a number a of bits of data signals in the n-bit data signals (where a is an integer such that $2 \leqq a < n$, and b is an integer such that $1 \leqq b \leqq a$). It also includes a number b of clock extraction circuits for extracting clocks from the selected b-bit data signals. The data signal reception section further includes a reference clock signal distributing circuit and a number n of phase adjusting circuits. The distributing circuit distributes b-bit reference clock signals to the n phase adjusting circuits for generating the reproduction clock signals. The phase adjusting circuits are provided for each of the n-bit data signals for adjusting the timings of the reference clock signal and the data signal for each bit. Each of the phase adjusting circuits produces n-bit reproduction clock signals providing the timing for sampling and redigitizing the data signals.

In this apparatus, a number b of bits are selected from the a-bit data signals in the n-bit data signals by the data signal selection circuit (where a and b are integers such that $2 \leqq a < n$ and $1 \leqq b \leqq a$). Then, clocks are extracted from the selected b-bit data signals by the clock extraction circuit, and the extracted clocks are outputted to the phase adjusting circuits. Thus, the number of clock extraction circuits can be reduced.

In yet another aspect, the invention provides a signal communication system of a clock reproduction transmission type. The system includes a data signal transmission section for transmitting n-bit data signals, and a data signal reception section for receiving n-bit data signals. In this system, communication is conducted using optical or electric signals of bits of a degree of parallelism n (where n is an integer greater than 1), and clocks signals extracted from the communicated data signals are used as reproduction clock signals for redigitizing the data signals. The data signal transmission section includes an input circuit and a routing circuit. The input circuit receives a bit routing control signal designating a normally operable data signal bit and relating to the manner of routing the data signals to individual bits. The routing circuit routs the data signals to individual bits based on the bit routing control signal. The data signal reception section includes a clock signal extraction/selection circuit and a number n of phase adjusting circuits. The clock signal extraction/selection circuit receives a-bit data signals of the n-bit data signals (where a is an integer such that $2 \leqq a < n$), selects b bits in the a bits (where b is an integer such that $1 \leqq b \leqq a$), and outputs them as reference clock signals to be used as the basis of the reproduction clock signal. The phase adjustment circuits are provided for each of the n-bit data signals. They adjust the timings of the reference clock signal and the data signals for each bit, and each of them produces n-bit reproduction clock signals providing the timing of sampling and redigitizing the data signals. The system further includes a circuit which, in case an abnormality occurs in a number c of data signals in the n-bit data signals (where c is an integer such that $1 < c < n$, and n is an integer greater than 1) thus disabling communication between the data signal transmission section and the data signal reception section, routs the data for the disabled bit to other, normally operable bits, i.e., n-c bits, so that data communication can be conducted.

In this system, communication can be normally conducted in the event of an abnormality in any of the data communication bits by routing the abnormal bits to normally operable bits. The manner of routing the data signals in case c bits in the n-bit data signals (where n is an integer greater than 1, and c is an integer such that 1<c<n) failed may employ a circuit for restoring the data signal of each bit back to the original order of data in accordance with the bit routing control signal. Alternatively, the routing of the data for the disabled c bits to the normal n-c bits may be conducted on a bit-by-bit basis, k-bit data basis, or a packet data basis.

DESCRIPTION OF THE PREFERRED EMBODIMENTS

Figure 1:
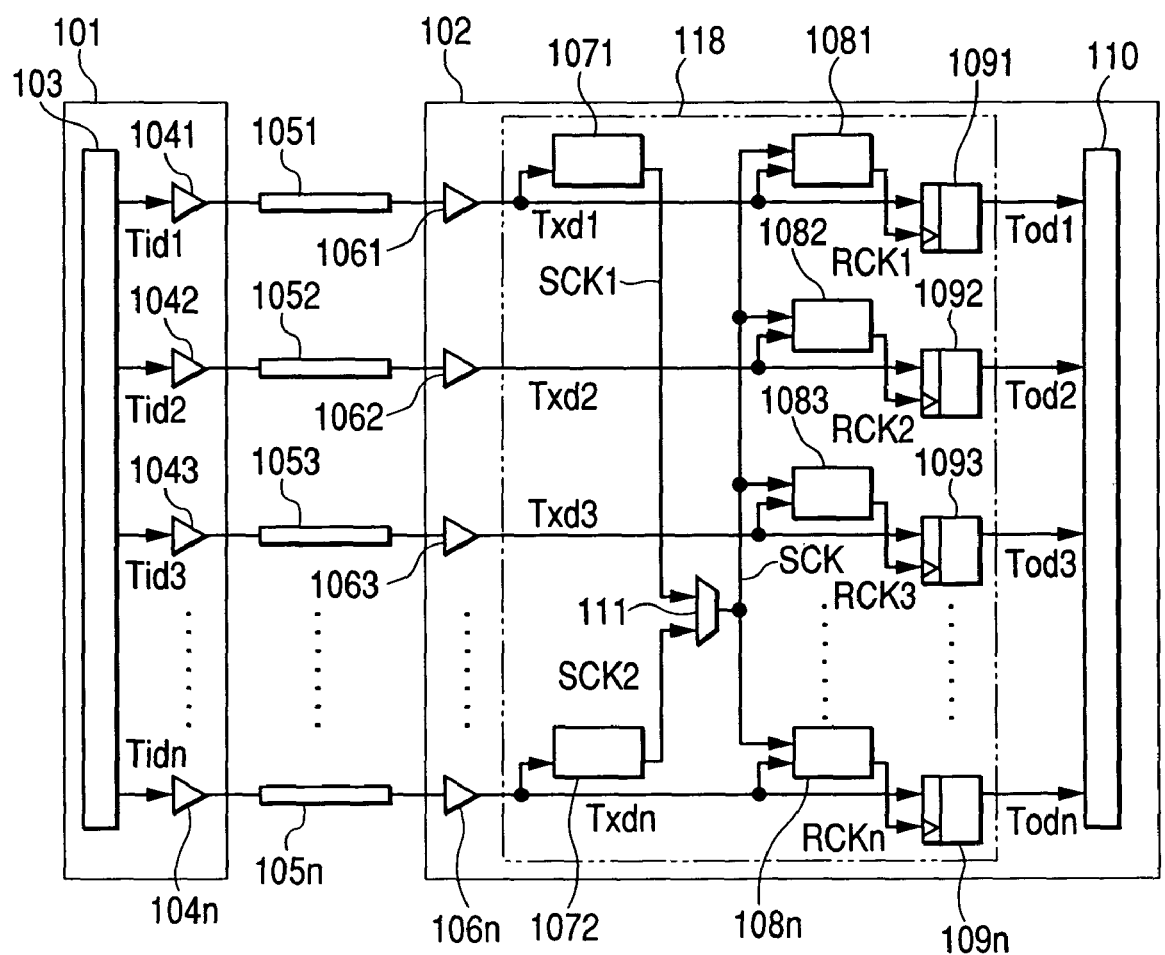
FIG. 1 shows a block diagram of a basic configuration of the signal communication apparatus according to a first embodiment of the invention.

A signal communication apparatus according to a first embodiment of the invention will be described by referring to the drawings. The signal communication apparatus according to the first embodiment forms the basic configuration of the signal communication apparatuses according to other embodiments of the invention. Referring to FIG. 1, the signal communication apparatus according to the present embodiment comprises a signal communication apparatus 101 for transmitting n-bit data signals (where n is an integer larger than 1), and a signal communication apparatus 102 for receiving the n-bit data signals transmitted from the signal communication apparatus 101. The signal communication apparatus 101 comprises an internal circuit 103 for outputting n-bit data signals Tid1, Tid2, Tid3, . . . Tidn, output buffer circuits 1041, 1042, 1043, . . . 104n, and transmission lines 1051, 1052, 1053, . . . 105n connecting the apparatus 101 and the apparatus 102. The transmission lines are optical fibers or conductor lines, for example. Data signals Tid1, Tid2, Tid3, . . . Tidn are outputted via the output buffer circuits 1041, 1042, 1043, . . . 104n to the transmission lines 1051, 1052, 1053, . . . 105n in the form of optical or electrical signals, for example.

On the other hand, the signal communication apparatus 102 includes input buffer circuits 1061, 1062, 1063, . . . 106n that receive the n-bit data signals transmitted via the transmission lines 1051, 1052, 1053, . . . 105n, and then output n-bit data signals Txd1, Txd2, Txd3, . . . Txdn. This configuration of the signal communication apparatus is the same as that of the signal communication apparatus shown in FIG. 14. The signal communication apparatus 102 further includes a clock/data signal reproduction circuit section 118 for extracting a clock signal from a data signal and for re-digitizing the data signal. It also includes a first clock signal reproduction circuit 1071 for extracting a clock signal SCK1 from a data signal Txd1, and a second clock signal reproduction circuit 1072 for extracting a clock signal SCK2 from a data signal Txdn. The signal communication apparatus 102 further includes a selector circuit 111 for selecting one of the clock signals SCK1 or SCK2 extracted by the two clock signal reproduction circuits 1071 and 1072. The clock signal selected by the selector circuit 111 is used as the reference clock signal SCK as the basis of reproduction clock signals that are used for reproducing the data signal. In addition, the signal communication apparatus 102 includes phase adjusting circuits 1081, 1082, 1083, . . . 108n for comparing the reference clock signal SCK with each of the data signals Txd1, Txd2, Txd3, . . . Txdn and outputting reproduction clock signals RCK1, RCK2, RCK3, . . . RCKn with an adjusted phase for correct reproduction of the data signal. The signal communication apparatus B 102 further includes flip-flop circuits 1091, 1092, 1093, . . . 109n for outputting data signals Tod1, Tod2, Tod3, . . . Todn synchronized with the reproduction clock signals on the basis of the data signals Txd1, Txd2, Txd3, . . . Txdn and the reproduction clock signals RCK1, RCK2, RCK3, . . . RCKn. The data signals Tod1, Tod2, Tod3, . . . Todn synchronized with the reproduction clock signals are received by an internal circuit 110.

Figure 14:
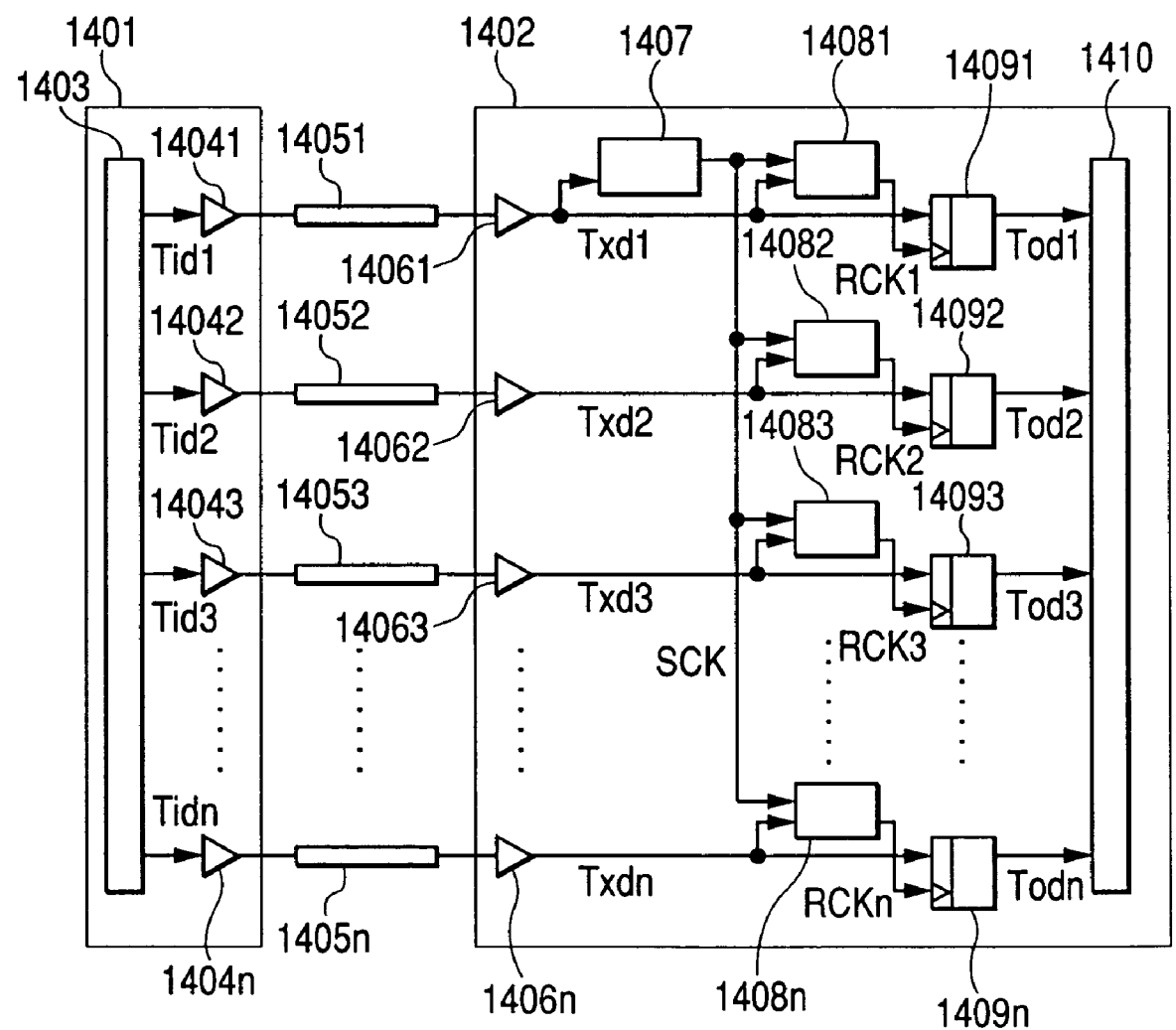
FIG. 14 shows a block diagram of a conventional signal transmission/reception circuit.

The circuit configuration shown in FIG. 14 includes just one clock signal reproduction circuit for extracting the clock signals from the data signals. As a result, the reference clock signal SCK cannot be extracted if an abnormality develops in the data signal Txd1 of the bit for the extraction of the clock signal and, furthermore, communication of data signals is disabled even in n−1 bits other than Txd1 where the abnormality took place. On the other hand, in the example of the signal communication circuit according to the above-described embodiment, where two clock signal reproduction circuits for extracting clock signals from the data signal are provided, the clock signals can be extracted from the data signals Txd1 and Txdn, for example, with two separate bits.

Thus, in this new configuration, if an abnormality develops in the data signal of the bit from which the reference clock signal SCK is to be extracted, such as Txd1, for example, the reference clock signal SCK can be extracted from the data signal of a different bit, such as Txdn. Accordingly, the n−1 bit data signals other than Txd1 where the abnormality took place can be normally communicated, so that the reliability of the apparatus can be increased.

Figure 2:
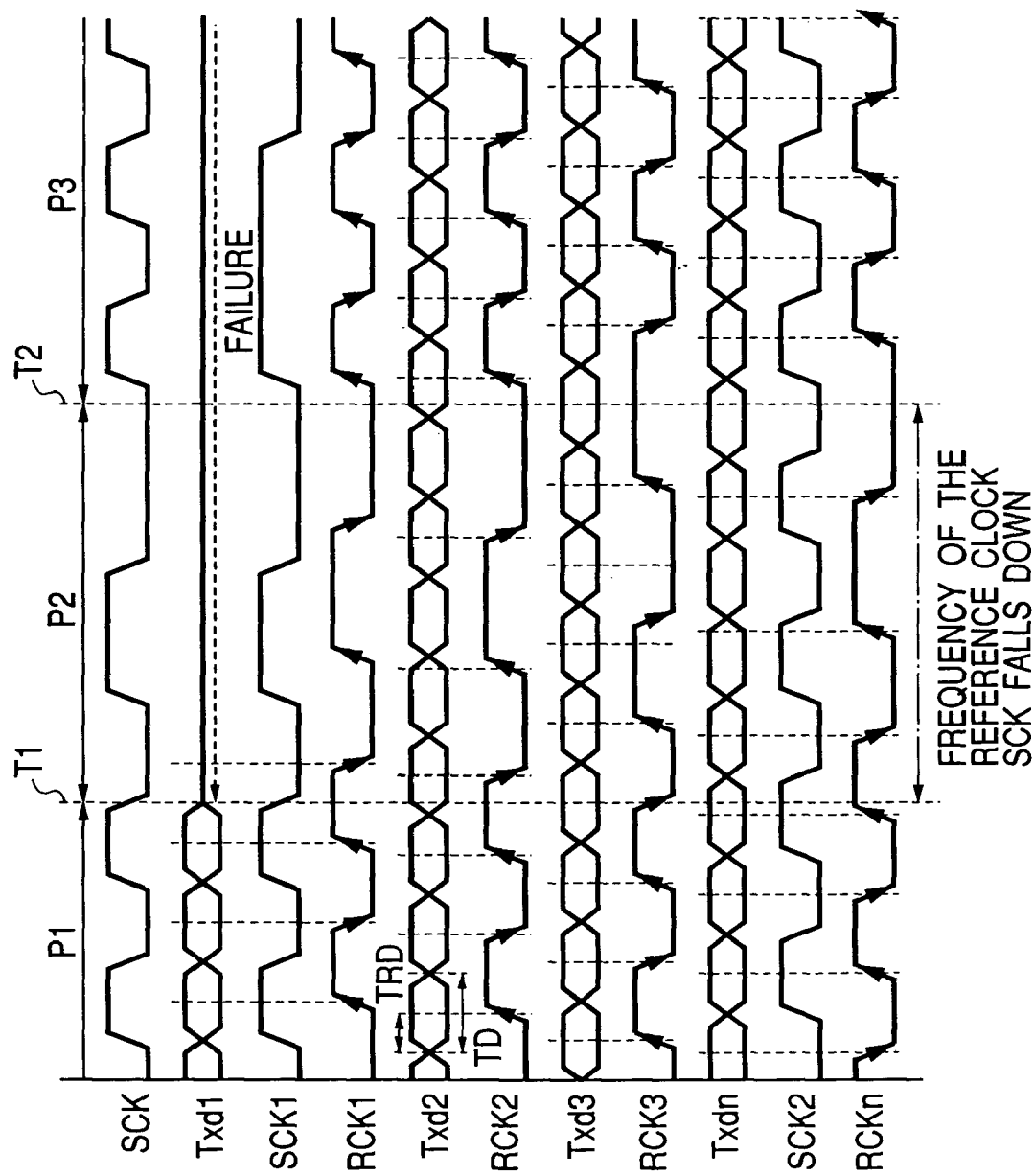
FIG. 2 shows a waveform chart illustrating the signal timing relationships in the event of bit abnormality in the signal communication apparatus shown in FIG. 1.

FIG. 2 shows the timing relationships among the signals in the basic configuration of the signal communication apparatus shown in FIG. 1 by way of the waveforms of the signal SCK (reference clock signal) and the signals Txd1, Txd2, Txd3, Txdn, SCK1, SCK2, RCK1, RCK2, RCK3, and RCKn. As shown in FIG. 2, the clock signal reproduction circuit 1071 extracts the clock signal SCK1 synchronized with the data signal Txd1. Similarly, the clock signal reproduction circuit 1072 extracts the clock signal SCK2 synchronized with the data signal Txdn.

In the example of FIG. 2, the frequency of the clock signals SCK1 and SCK2 is one-half of the transmission frequency of the data signals. Preferably, the frequency may be multiples or divisions of the transmission frequency of the data signals. In FIG. 2, the phase of the individual data signals Txd1, Txd2, Txd3, and Txdn are shifted with respect to one another between the individual bits. This is because of the difference in propagation time in the transmission line for each bit. This phenomena is generally called "bit-to-bit skew". Further, each data signal suffers from the so-called phenomenon of "jitter", namely phase fluctuations caused by environmental changes including signal attenuation in the transmission line and power supply temperature. The bit-to-bit skew and jitters can disrupt the phase relationships among the reference clock signal SCK and the data signals Txd1, Txd2, Txd3, . . . Txdn for the individual bits, so that it might be impossible to ensure a timing margin in the next-stage flip-flop.

In order to ensure a timing margin in the next-stage flip-flops 1091, 1092, 1093, . . . 109n for the individual-bit data signals Txd1, Txd2, Txd3, . . . Txdn, the phase adjusting circuits 1081, 1082, 1083, . . . 108n produce phase-adjusted reproduction clock signals RCK1, RCK2, RCK3, . . . RCKn. In the example shown in FIG. 2, the relationship between the phase of the reproduction clock signals and that of the data signals is adjusted such that a phase difference TRD between the rise and fall edges of the reproduction clock signal and those of the data signal is one-half of a data signal period TD. In the apparatus shown in FIG. 2, as the flip-flops 1091, 1092, 1093, . . . 109n in the next stage (FIG. 1) sense both the rise and fall of the clock signals, the frequency of the reproduction clock signals RCK1, RCK2, RCK3, . . . RCKn is set to be one half the transmission frequency of the data signal. However, when a different type of flip-flops is used, the frequency may be set accordingly.

Hereafter, the timing relationships will be described for switching the reference clock signal SCK in case an abnormality develops in the data signal Txd1 of the bit for the extraction of clock signal in the clock signal reproduction transmission system operated with the above-described timing relationships.

It is now assumed that abnormality arose in the data signal Txd1 at time T1, as shown in FIG. 2. Time T2 is when the clock signal used as the reference clock signal SCK has been switched from SCK1 to SCK2. During period P1, clock signal SCK1 extracted from data signal Txd1 is used as the reference clock signal SCK. After time T1, the rise and fall edges of the data signals cannot be detected due to the abnormality in the data signal Txd1, so that the clock signal SCK1 selected as the reference clock signal SCK gradually deviates from the one-half frequency of the data signal TD/2. Similarly, the frequency of the reproduction clock signal RCK1, RCK2, RCK3, . . . RCKn for each bit deviates from the one-half frequency of the data frequency TD/2. As a result, the flip-flop circuits 1091, 1092, 1093, . . . 109n cannot correctly redigitize the data signals. Accordingly, in the signal communication apparatus according to the present embodiment, an abnormality in the reference clock signal SCK is detected during period P2, and then the reference clock signal SCK is switched from SCK1 to SCK2. Thus, in period P3 following the time T2 when the switching of the reference clock signal SCK from SCK1 to SCK2 is completed, the normal clock signal SCK2 extracted from the data signal Txdn can be used as the reference clock signal SCK, so that the generation of the reproduction clock signals RCK2, RCK3, . . . RCKn can be resumed.

Thus, communication can be resumed as far as data signals other than the data signal Txd1 with an abnormality, that is the n−1 bit data signals, are concerned. The detection of an abnormality in the clock signal will be later described by referring to FIG. 7 in the description of a fourth embodiment (fourth configuration) of the invention.

In the signal communication apparatus according to the first embodiment (basic configuration), the number of clock signals extracted from the data signal bits is two and the number of reference clock signals selected from the clock signals is one. However, it goes without saying that the invention can also be adapted to general cases where the number of the extracted clock signals is a (where a is an integer such that $2 \leq a < n$), and the number of reference clock signals selected is b (where b is an integer such that $1 \leq b \leq a$).

Figure 3:
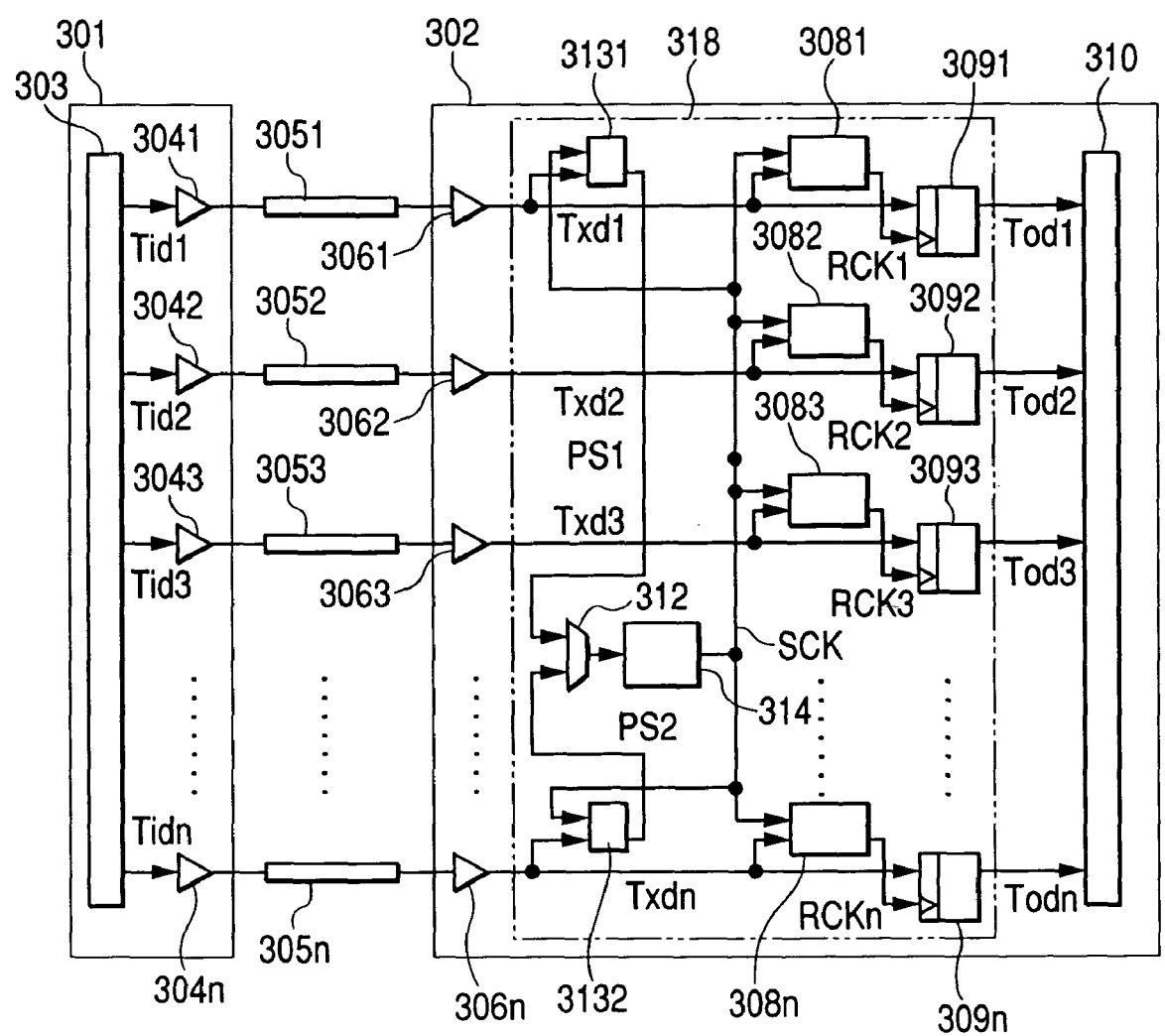
FIG. 3 shows a block diagram of the signal communication apparatus according to a second embodiment (second configuration) of the invention.

In the following, the signal communication technique according to a second embodiment of the invention will be described. FIG. 3 shows a second configuration of the signal communication apparatus according to the second embodiment. As shown, the signal communication apparatus includes a signal communication apparatus A 301, a signal communication apparatus B 302, an internal circuit 303, and output buffer circuits 3041, 3042, 3043, . . . 304n. The internal circuit 303 is included in the signal communication apparatus A 301 and outputs n-bit data signals Tid1, Tid2, Tid3, . . . Tidn (where n is an integer greater than 1). Numerals 3051, 3052, 3053, . . . 305n designate signal transmission lines. The signal communication apparatus B 302 includes input buffer circuits 3061, 3062, 3063, . . . 306n for outputting n-bit data signals Txd1, Txd2, Txd3, . . . Txdn. It also includes phase-adjusting circuits 3081, 3082, 3083, . . . 308n for outputting phase-adjusted reproduction clock signals RCK1, RCK2, RCK3, . . . RCKn for the correct reproduction of data signals. The signal communication apparatus B 302 further includes flip-flop circuits 3091, 3092, 3093, . . . 309n for outputting data signals Tod1, Tod2, Tod3, . . . Todn synchronized with the reproduction clock signals, and an internal circuit 310 to which the data signals Tod1, Tod2, Tod3, . . . Todn are inputted. The second configuration shown in FIG. 3 is similar to the first configuration (basic configuration) except for the configuration of the circuit for extracting the clock signal from the data signals. The apparatus according to the second configuration is further characterized in that part of the circuit for extracting the clock signal from the data signal is redundantly provided. Other circuits are shared with those of the basic configuration. As shown in FIG. 3, the circuit section enclosed by a two-dot chain line and referenced by numeral 318 is the clock/data signal reproduction circuit section for extracting the clock signal from the data signals and for re-digitizing the data signals.

Hereafter, the case where the clock-signal extracting circuit is configured from a phase-synchronizing circuit or a so-called phase-locked loop ("PLL") will be described. In general, a phase-synchronizing circuit is comprised of three elements: a phase comparator, a loop filter, and a voltage-controlled oscillator. In FIG. 3, a first phase comparator 3131 compares the phase of the data signal Txd1 and reference clock signal SCK, and then outputs a phase comparison signal PS1. A second phase comparator 3132 compares the phase of the data signal Txdn and reference clock signal SCK and outputs a phase comparison signal PS2. A selector circuit 312 selects and outputs one of the phase comparison signals PS1 or PS2. The remaining components of the phase synchronizing circuit, namely the loop filter and voltage-controlled oscillator, are formed by an element 314. When phase comparison signal PS1 is selected by the selector circuit 312, the phase comparator 3131 and the loop filter and voltage-controlled oscillator 314 constitute the phase synchronizing circuit. In this case, the phase synchronizing circuit functions as a clock signal reproduction circuit, which extracts the clock signal from the data signal Txd1 and outputs it as the reference clock signal SCK.

On the other hand, when the phase comparison signal PS2 is selected, a phase synchronizing circuit is formed by the phase comparator 3132 and the loop filter/voltage-controlled oscillator 314. In this case, the phase synchronizing circuit functions as a clock signal reproduction circuit, which extracts the clock signal from data signal Txdn and outputs it as the reference clock signal.

Figure 15:
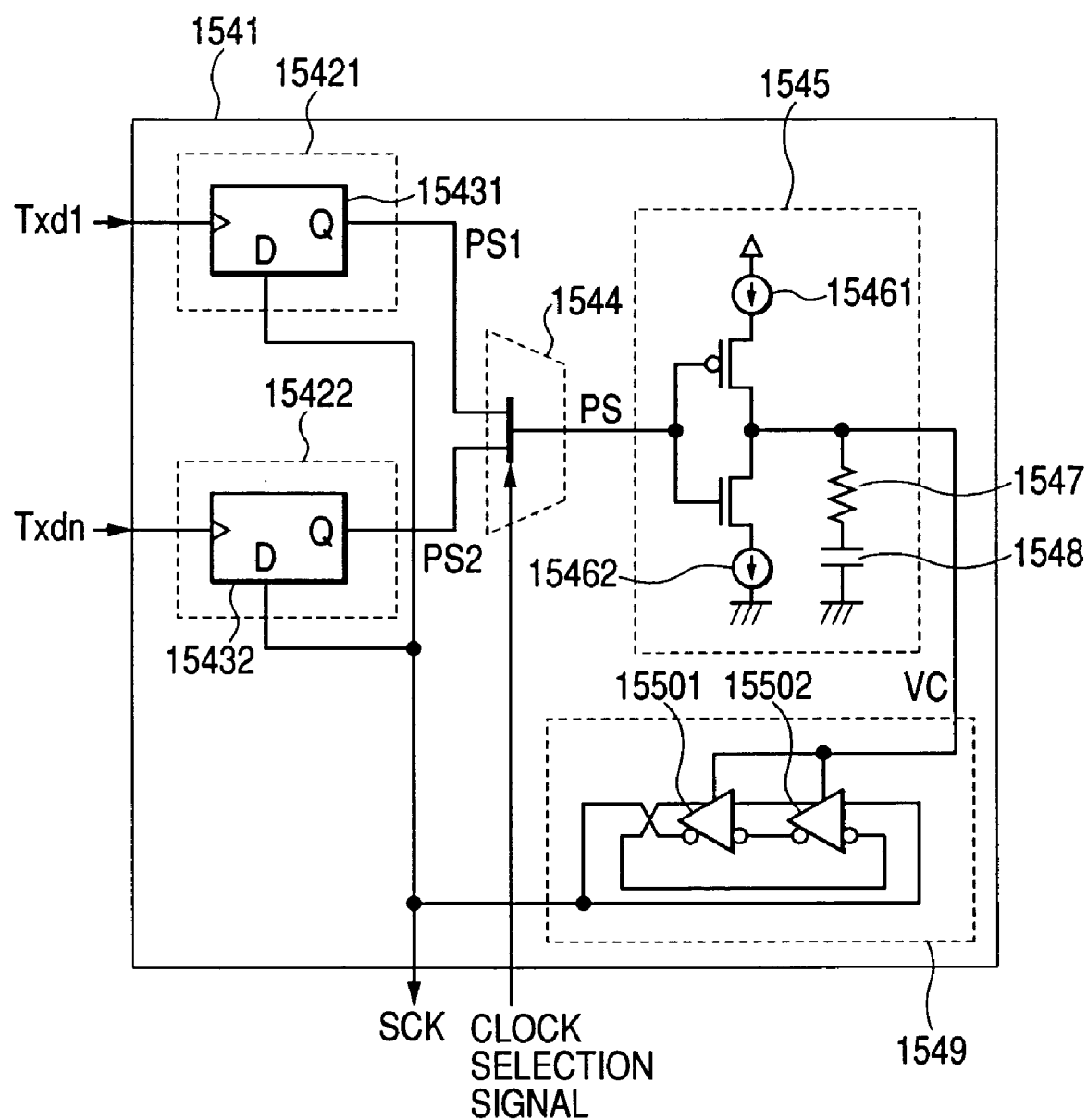
FIG. 15 shows detailed circuit diagram of a clock signal reproduction circuit in the circuit shown in FIG. 3.

Referring now to FIG. 15, the clock signal reproduction circuit will be described. A clock signal reproduction circuit 1541 includes components corresponding to the phase comparators 3131 and 3132, phase-comparison signal selector circuit 312, and loop filter/voltage-controlled oscillator 314 shown in FIG. 3. In FIG. 15, numeral 15421 designates a phase comparator corresponding to the phase comparator 3131 shown in FIG. 3. It compares the phase of the data signal Txd1 with that of the reference clock signal SCK and outputs a phase comparison signal PS1. Similarly, numeral 15422 designates a circuit corresponding to the phase comparator 3132 of FIG. 3, and it compares the phase of the data signal Txdn with that of the reference clock signal SCK to output a phase comparison signal PS2. Numerals 15431 and 15432 designate D flip-flop circuits forming the phase comparators. The example shown in FIG. 15 employs bang-bang type phase comparators, whereby the phase of the data signal is compared with that of the clock signal and a low- or high-level signal is produced depending on phase advance or lag. The phase comparators may be replaced with other types of phase comparators. In the circuit shown in FIG. 15, a selector circuit 1544, which corresponds to the selector circuit 312 of FIG. 3, selects one of the phase comparison signals PS1 and PS2 by a clock selection signal and then outputs a phase comparison signal PS. The circuit shown in FIG. 15 includes a charge-pump circuit/loop filter 1545 and a voltage-controlled oscillator 1549. The charge-pump circuit/loop filter 1545 and the voltage-controlled oscillator 1549 correspond to the component 314 shown in FIG. 3.

Numerals 15461 and 15462 designate current sources for the charge-pump circuit. Numerals 1547 and 1578 designate a resistor and a capacitor of the loop filter, respectively. The loop filter outputs a control signal VC for the next-stage voltage-controlled oscillator in accordance with the phase comparison signal PS. The voltage-controlled oscillator 1549 is comprised of a two-stage loop connection of buffer circuits 15501 and 15502, for example. The voltage-controlled oscillator 1549 has its oscillation frequency controlled by the control voltage VC, and outputs a reference clock signal SCK with the same frequency as the transmission frequency of the data signals. The reference clock signal SCK is used as the basis of the data reproduction clock signals and is also fed to the phase comparators. In this circuit configuration, of the constituent elements of the clock reproduction circuit, the loop filter and the voltage-controlled oscillator can share signals Txd1 and Txdn, so that the number of circuits can be reduced.

Figure 4:
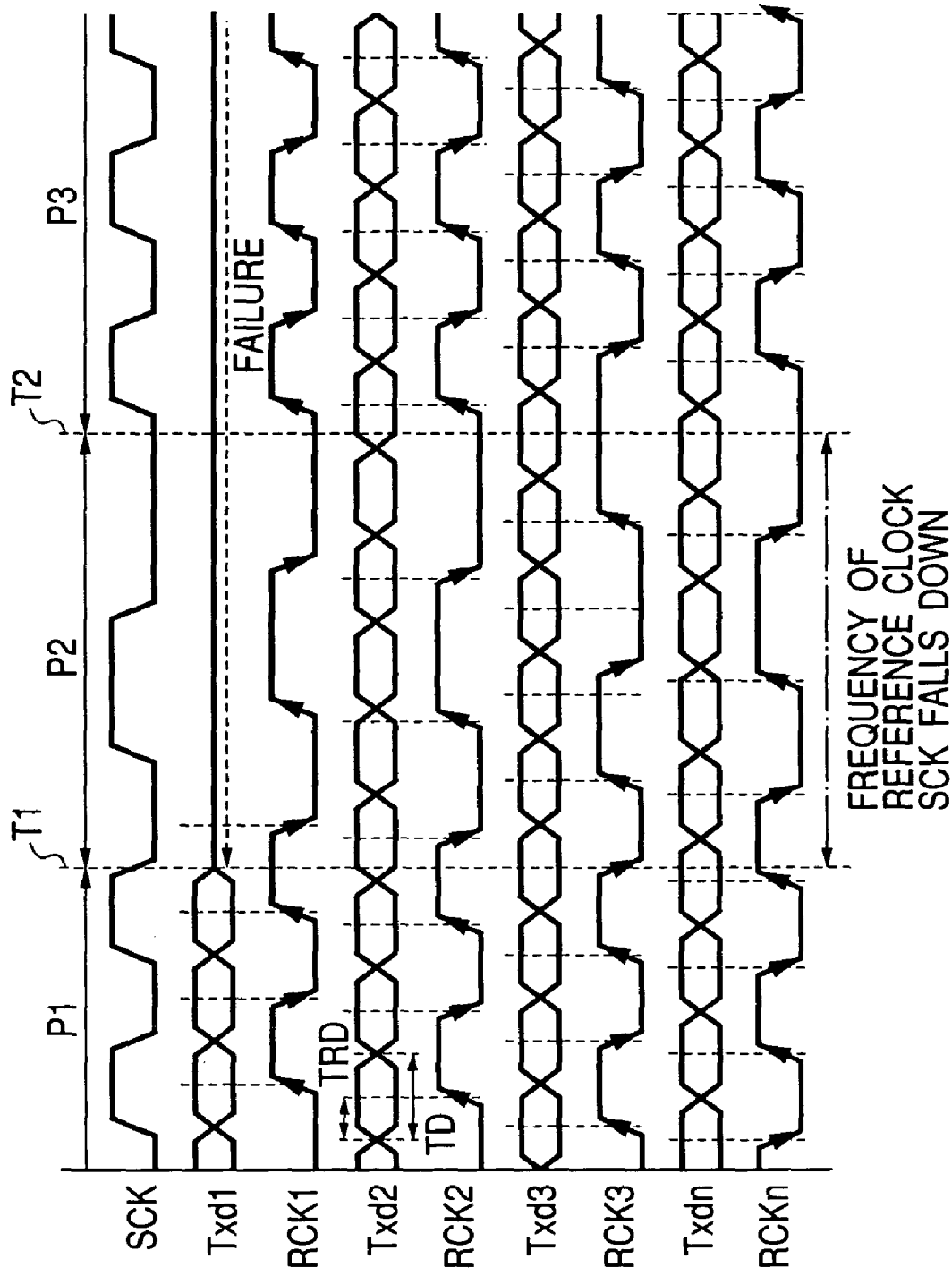
FIG. 4 shows a waveform chart illustrating the signal timing relationships in the event of bit abnormality in the signal communication apparatus shown in FIG. 3.

FIG. 4 is a timing chart of the signal communication apparatus according to the second embodiment (second configuration) of the invention shown in FIG. 3, illustrating the waveforms of signals SCK, Txd1, Txd2, Txd3, Txdn, RCK1, RCK2, RCK3, and RCKn. The details of the timing relationships concerning the clock signal reproduction transmission system are similar to those shown in FIG. 2 and therefore will not be described. The following description will be directed to the timing relationships concerning the switching of the reference clock signal SCK in case an abnormality arises in the data signal Txd1 of the bit from which clock signal is to be extracted.

As shown in FIG. 4, time T1 is when an abnormality arose in data signal Txd1. Time T2 is when the data signal from which reference clock signal SCK is to be extracted is switched from Txd1 to Txdn. In an intermediate period P1, phase comparison signal PS1 is selected by the selector circuit 312 and the phase synchronizing circuit is formed by the phase comparator 3131 and the loop filter/voltage-controlled oscillator 314, so that reference clock signal SCK is extracted from data signal Txd1. After time T1, the rise and fall edges of data signals cannot be detected due to the occurrence of an abnormality in the data signal Txd1 and, as a result, the reference clock signal SCK gradually deviates from the one-half of frequency of the data signal TD/2. Similarly, the frequency of the reproduction clock signals RCK1, RCK2, RCK3, . . . RCKn also deviates from the one-half frequency of data signal TD/2, so that the flip-flop circuits 3091, 3092, 3093, . . . 309n cannot correctly redigitize data signals. Accordingly, in the signal communication apparatus according to the second embodiment (second configuration), abnormality in the reference clock signal SCK is detected in period P2. The phase comparison signal is then switched to PS2 by the selector circuit 312 to thereby form the phase synchronizing circuit by the phase comparator 3132 and the loop filter/voltage-controlled oscillator 314, so that the data signal from which the reference clock signal SCK is extracted is switched from Txd1 to Txdn.

Thus, in period P3 following time T2 when the switching of clock signal is completed, a normal clock signal extracted from data signal Txdn is used as the reference clock signal SCK. The generation of the reproduction clock signals RCK2, RCK3, . . . RCKn can be therefore resumed, so that communication can be resumed regarding the data signals other than the data signal Txd1 with the abnormality, namely n−1 bit data signals. While the second configuration employs two circuits for the extraction of the clock signal from a data signal bit and involves one reference clock signal, the concept of the invention can be also adapted to cases where the number of the clock signal-extraction circuits is a (where $2 \leq a \leq n$, and a is an integer), and the number of the reference clock signal is b (where $1 \leq b \leq a$, and b is an integer).

Figure 5:
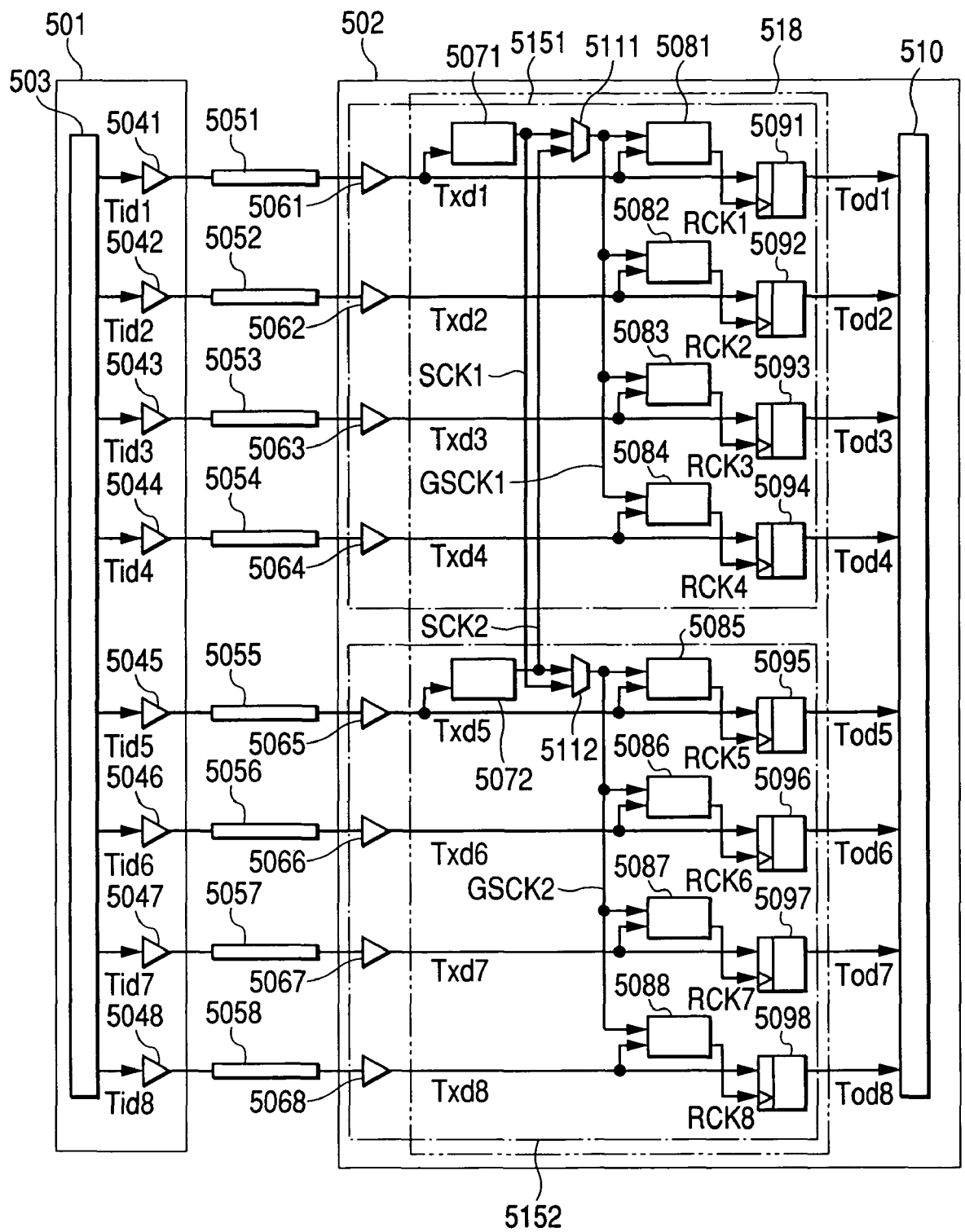
FIG. 5 shows a block diagram of the signal communication apparatus according to a third embodiment (configuration) of the invention.

Hereafter, the signal communication apparatus according to a third embodiment of the invention will be described. FIG. 5 shows the third configuration of the signal communication apparatus, which includes a signal communication apparatus A 501 and a signal communication apparatus B 502. The signal communication apparatus A 501 includes an internal circuit 503 for outputting 8-bit data signals Tid1, Tid2, Tid3, . . . Tid8, output buffer circuits 5041, 5042, 5043, . . . 5048, and transmission lines 5051, 5052, 5053, . . . 5058. The signal communication apparatus B 502 includes input buffer circuits 5061, 5062, 5063, . . . 5068 for outputting 8-bit data signals Txd1, Txd2, Txd3, . . . Txd8, and phase adjusting circuits 5081, 5082, 5083, . . . 5088 for outputting phase-adjusted reproduction clock signals RCK1, RCK2, RCK3, . . . RCK8 for the correct reproduction of data signals. The signal communication apparatus B 502 further includes flip-flop circuits 5091, 5092, 5093, . . . 5098 for outputting data signals Tod1, Tod2, Tod3, . . . Tod8 synchronized with the reproduction clock signals, and an internal circuit 510 to which the data signals Tod1, Tod2, Tod3, . . . Tod8 are fed.

The signal communication apparatus according to the third embodiment (third configuration) is similar to the basic configuration except for the circuit for extracting clock signal and the circuit for distributing the reference clock signal to the phase adjusting circuits 5081, 5082, 5083, . . . 5088 in the signal communication apparatus B 502. Thus, the similar components will not be described. In the third configuration, the data signals are divided into two groups of four bits each.

A section 5151 enclosed by a one-dot chain line is a first group section consisting of data signals Txd1, Txd2, Txd3, and Txd4. Another section 5152 enclosed by a one-dot chain line is a second group section consisting of data signals Txd5, Txd6, Txd7, and Txd8. The signal communication apparatus B 502 includes a clock/data signal reproduction circuit section 518 (section enclosed by a two-dot chain line) for extracting clock signals from data signals and for re-digitizing data signals. It also includes a first clock signal reproduction circuit 5071 for extracting a clock signal SCK1 from data signal Txd1, and a second clock signal reproduction circuit 5072 for extracting a clock signal SCK2 from data signal Txd5. A selector circuit 5111 selects one of clock signals SCK1 and SCK2 extracted by the two clock signal reproduction circuits 5071 and 5072. The clock signal selected by the selector circuit 5111 is used as a reference clock signal GSCK 1 that is the basis of the reproduction clock signal used for the reproduction of data signals in the first group.

Another selector circuit 5112 selects one of the clock signals SCK1 and SCK2 extracted by the two clock signal reproduction circuits. The clock signal selected by this circuit is used as a reference clock signal GSCK2 that is the basis of the reproduction clock signal used for the reproduction of the data signals in the second group.

During normal operation, the clock signal SCK1 extracted from the data signal Txd1 is selected as the reference clock signal GSCK1 in the first group. In the second group, the clock signal SCK2 extracted from the data signal Txd5 is selected as the reference clock signal GSCK2.

In the third configuration shown in FIG. 5, there is provided a clock signal reproduction circuit for each group for extracting clock signals from data signals. Thus, a clock signal extracted in one group can be used as the reference clock signal in the other. For example, the clock signal SCK2 extracted in the second group can be used as the reference clock signal GSCK1 in the first group.

Accordingly, if an abnormality arises in the data signal for the extraction of the clock signal, such as Txd1 in the first group, for example, the second group can continue communication normally. Further, by using a clock signal extracted in the second group as the reference clock signal in the first group, the data signals for bits other than the failed bit Txd1, namely Txd2, Txd3, and Txd4, can be normally communicated, thereby increasing the reliability in signal communication. While the third configuration employs 8-bit data signals and two groups, the concept of the invention can be generally adapted to a signal communication apparatus with a number of bits n (where n is an integer greater than 2) and a number of groups m (where m is an integer smaller than n and greater than 2).

Figure 6:
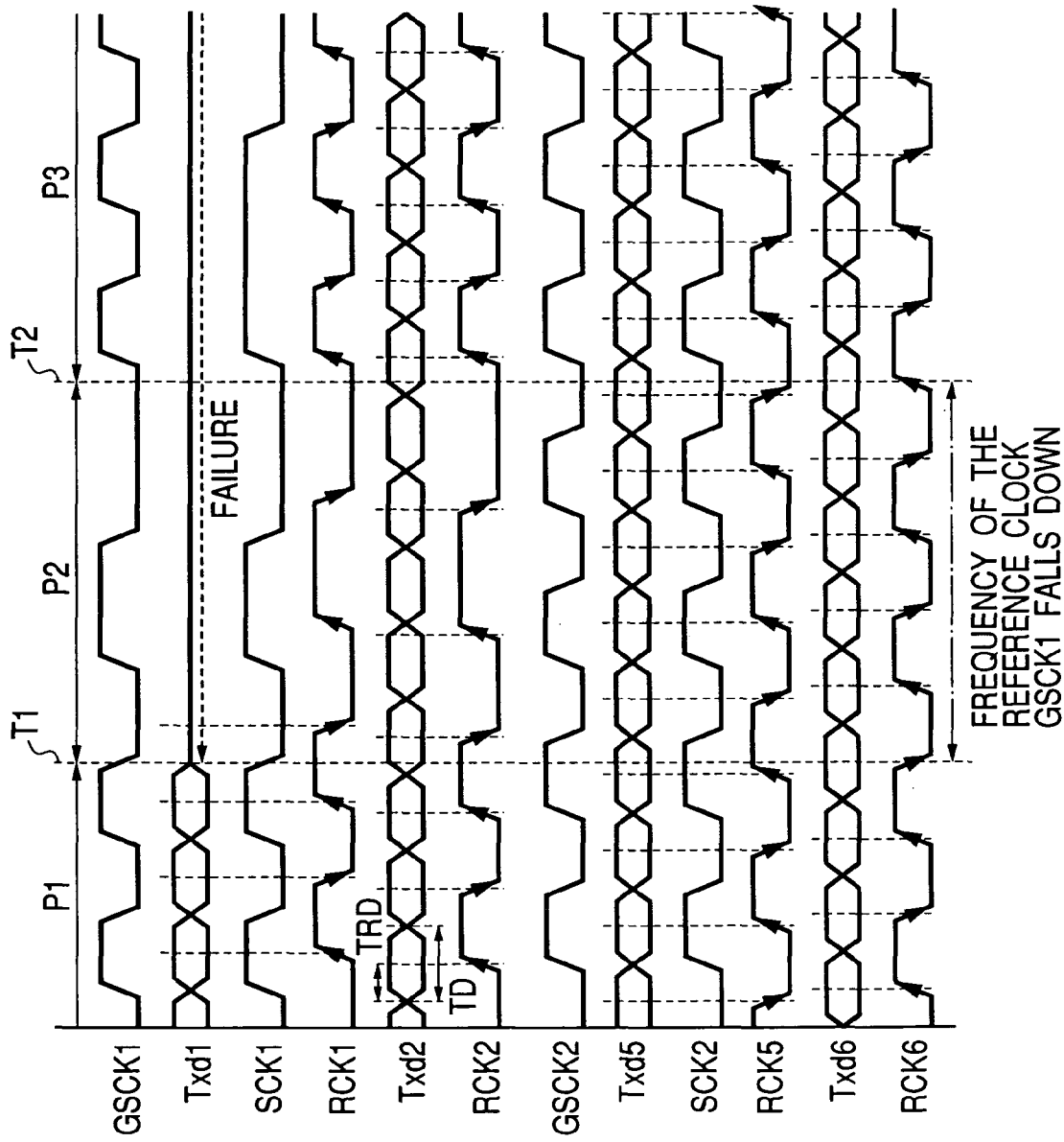
FIG. 6 shows a waveform chart illustrating the signal timing relationships in the event of bit abnormality in the signal communication apparatus shown in FIG. 5.

FIG. 6 shows signal timing relationships in the signal communication apparatus according to the third embodiment (third configuration) of the invention shown in FIG. 5, illustrating the waveforms of signals GSCK1, GSCK2, SCK1, SCK2, Txd1, Txd2, Txd5, Txd6, RCK1, RCK2, RCK5, and RCK6. The details of the timing relationships concerning the clock signal reproduction transmission system are similar to those shown in FIG. 2 and will therefore not be described. In the following, a case will be described, for example, where an abnormality occurs in the data signal Txd1 of the bit from which the clock signal is to be extracted in the first group.

As shown in FIG. 6, time T1 is when an abnormality took place in data signal Txd1, and time T2 is when the clock signal used as the reference clock signal GSCK1 in the first group was switched from SCK1 to SCK2. During period P1, the clock signal SCK1 extracted from data signal Txd1 as the reference clock signal GSCK1 for the first group is used. After time T1, an abnormality occurs in the data signal Txd1, so that the rise and fall edges of the data signals cannot be detected. As a result, the frequency of the clock signal SCK1 selected as the reference clock signal GSCK1 in the first group gradually deviates from the one-half frequency of the data signal TD/2. Similarly, the frequency of the reproduction clock signals RCK1, RCK2, RCK3 and RCK4 for each bit in the first group deviates from the one-half frequency of the data signal TD/2, so that the data signals cannot be correctly redigitized in the flip-flop circuits 5091, 5092, 5093, and 5094.

Thus, in the signal communication apparatus according to the present embodiment, an abnormality in the reference clock signal GSCK1 is detected in period P2, and the reference clock signal GSCK1 is switched from SCK1 to SCK2. Thus, in period P3 after time T2 when the switching of the clock signal is completed, a normal clock signal SCK2 extracted from data signal Txd5 in the second group is used as the reference clock signal GSCK1 in the first group. In this way, the generation of the reproduction clock signals RCK2, RCK3, and RCK4 is resumed, so that the communication of the data signals other than data signal Txd1 with an abnormality in the first group can be resumed.

The abnormality in data signal Txd1 of the bit for the extraction of the clock signal in the first group does not affect the second group, so the data signals in the second group can be correctly communicated in all of the periods P1, P2, and P3.

Figure 7:
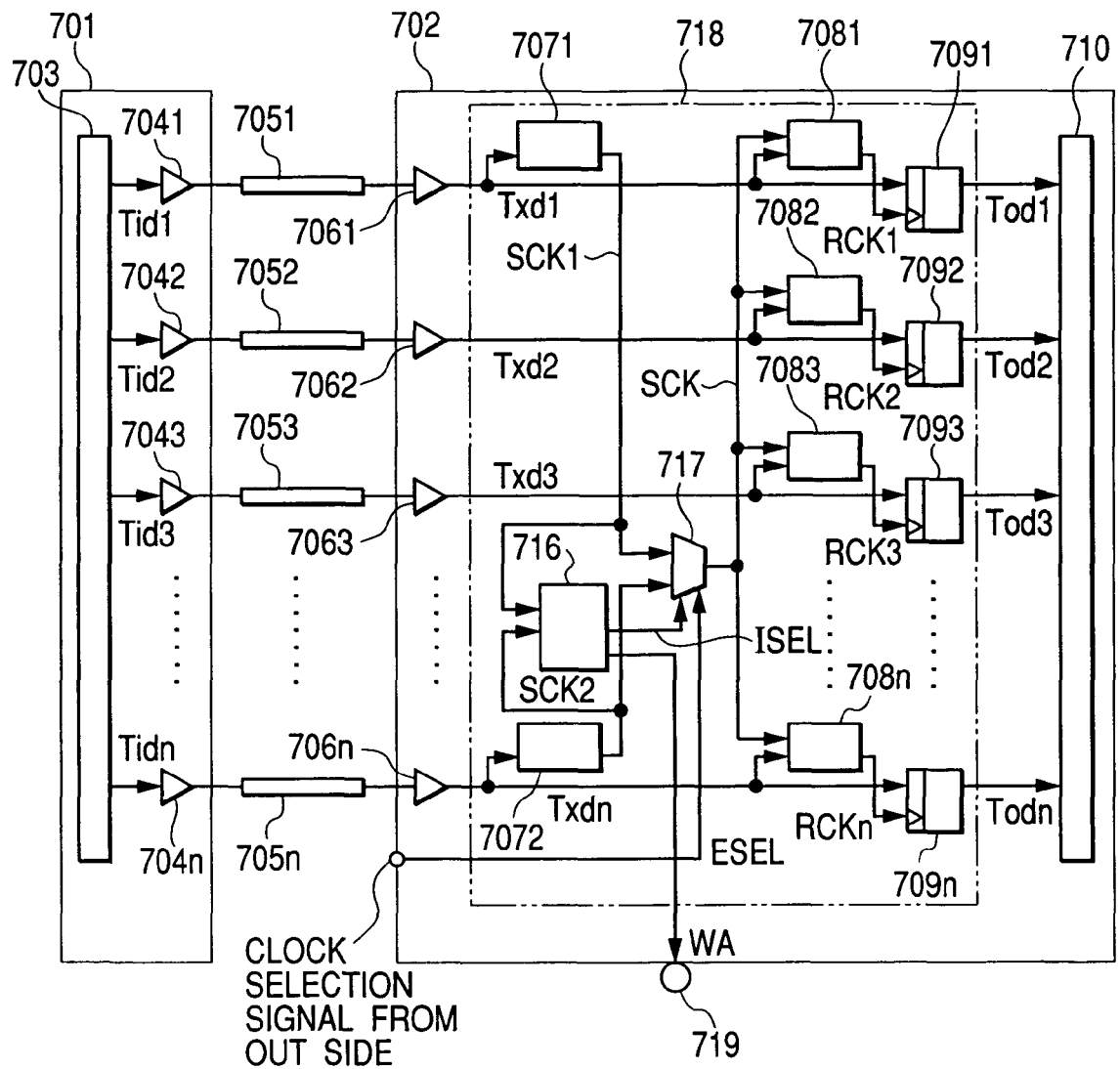
FIG. 7 shows a block diagram of the signal communication apparatus according to a fourth embodiment (configuration) of the invention.

Hereafter a fourth embodiment of the signal communication apparatus according to the invention will be described. FIG. 7 shows the signal communication apparatus according to the fourth embodiment (configuration) of the invention. As shown, the apparatus comprises a signal communication apparatus A 701 and a signal communication apparatus B 702. The signal communication apparatus A 701 includes an internal circuit 703 for outputting n-bit data signals Tid1, Tid2, Tid3, . . . Tid*n* (where n is an integer greater than 1), output buffer circuits 7041, 7042, 7043, . . . 704*n*, and transmission lines 7051, 7052, 7053, . . . 705*n*.

The signal communication apparatus B 702 includes input buffer circuits 7061, 7062, 7063, . . . 706n for outputting the n-bit data signals Txd1, Txd2, Txd3, . . . Txdn. It also includes a clock/data signal reproduction circuit section 718 for extracting clock signals from the data signals, and for re-digitizing the data signals. The signal communication apparatus B 702 further includes a clock signal reproduction circuit 7071 for extracting a clock signal SCK1 from data signal Txd1 and a clock signal reproduction circuit 7072 for extracting a clock signal SCK2 from data signal Txdn. The signal communication apparatus further includes phase adjusting circuits 7081, 7082, 7083, . . . 708n, flip-flop circuits 7091, 7092, 7093, . . . 709n, and an internal circuit 710. The phase adjusting circuits output phase-adjusted reproduction clock signals RCK1, RCK2, RCK3, . . . RCKn for the correct reproduction of the data signals. The flip-flop circuits outputs data signals Tod1, Tod2, Tod3, . . . Todn synchronized with the reproduction clock signals. The data signals Tod1, Tod2, Tod3, . . . Todn are fed to the internal circuit 710.

The signal communication apparatus according to the fourth configuration is similar to the basic configuration except for the circuit for monitoring the clock signals in the signal communication apparatus B 702 and the clock-signal selection circuit, and so the common configuration will not be described. As shown in FIG. 7, the fourth configuration includes a clock-signal monitoring circuit 716 that monitors the clock signals SCK1 and SCK2 extracted from data signals Txd1 and Txdn, and then outputs a selection signal ISEL for selecting a normal clock signal. The clock signal monitoring circuit 716 monitors the frequency or signal electric potential of the clock signals, for example, in order to detect abnormalities in the clock signals. One of the clock signals SCK1 and SCK2 is selected by a selector circuit 717 based on a clock signal selection signal ISEL fed from the clock signal monitoring circuit or an externally inputted clock signal selection signal ESEL as a control signal. The clock signal selected by the selector circuit 717 is used as the reference clock signal SCK as the basis of the reproduction clock signal used for the reproduction of the data signals. Numeral 719 designates an abnormality-indicating lamp that emits light in response to a clock-signal abnormality indicating a signal received from the clock signal monitoring circuit 716, so that the user of the signal communication apparatus can be informed about the occurrence of abnormalities.

The timing relationships of the signals in the signal communication apparatus according to the fourth configuration are similar to those of the basic configuration shown in FIG. 2 and will therefore not be described. In this configuration, the number of clock signals extracted from the data signal bits is two, and one reference clock signal is selected from the clock signals. However, the concept of the invention can be adapted to cases where the number of clock signals extracted is a (where a is an integer such that $2 \leq a < n$) and the number of reference clock signal selected is b (where b is an integer such that $1 \leq b \leq a$). In the fourth configuration, clock signals SCK1 and SCK2 extracted from data signals Txd1 and Txdn are monitored for detecting abnormalities in the clock signals. Alternatively, abnormalities may be detected by monitoring one or more of the voltage level, rise and fall edges, presence or absence of bit error, bit error rate, and the amount of jitter, in the data signals Txd1 and Txdn from which clock signals are extracted.

According to the first through fourth configurations of the signal communication apparatus of the invention, even if an abnormality develops in the data signal of the bit for extracting the clock signal, the remaining n−1 bits can be communicated. Thus, the reliability of the signal communication apparatus can be improved.

Hereafter, an example will be described where, based on the signal communication apparatus according to the first through fourth embodiments, the data signals are distributed to the correct bits in case bit abnormalities develop in some of the data signals.

Figure 8:
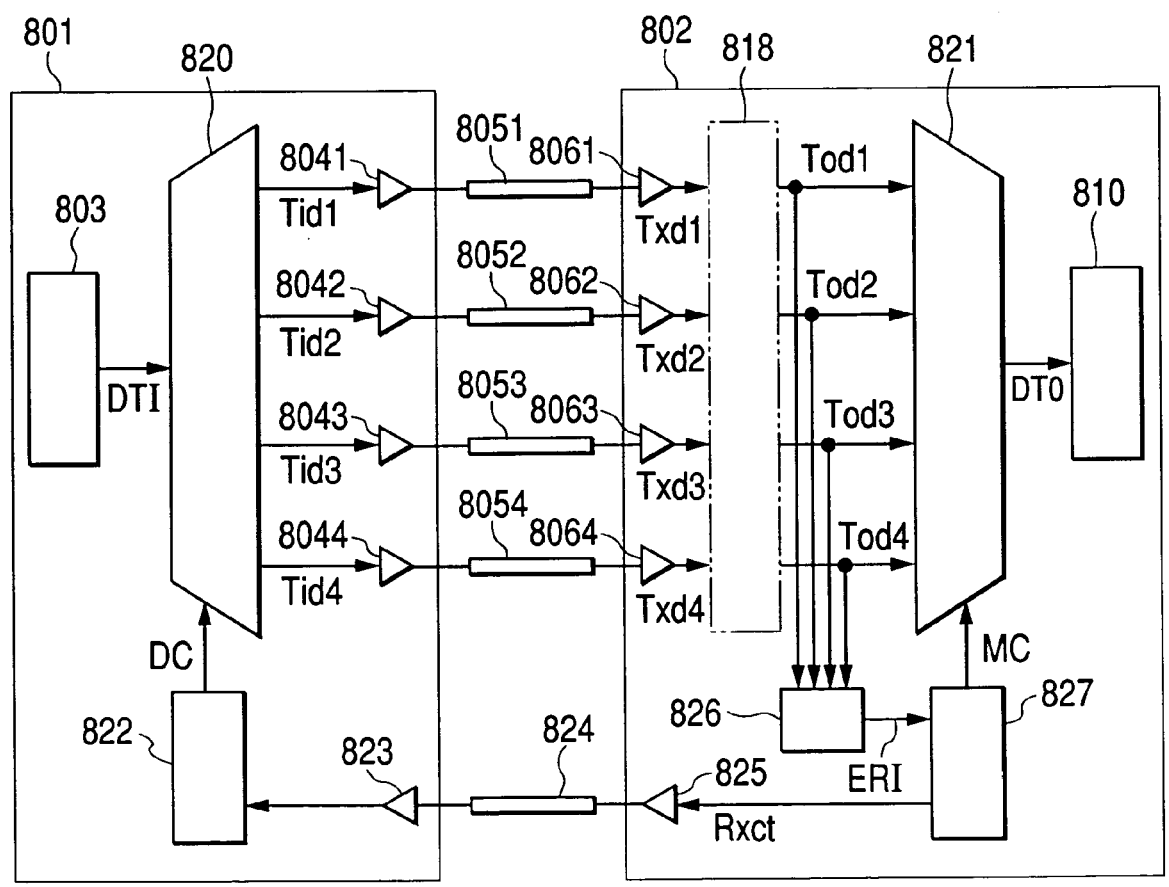
FIG. 8 shows a block diagram of the signal communication apparatus according to a fifth embodiment (configuration) of the invention.

FIG. 8 shows a fifth embodiment (configuration) of the signal communication apparatus according to the invention. As shown in FIG. 8, the signal communication apparatus according to the present embodiment includes a signal communication apparatus A 801 and a signal communication apparatus B 802. The signal communication apparatus A 801 includes an internal circuit 803 for outputting 1-bit serial data signal DTI, a demultiplexer circuit 820 for routing the input serial signal DTI into 4-bit data signals Tid1, Tid2, Tid3, and Tid4 in accordance with a demultiplexer control signal DC, and output buffer circuits 8041, 8042, 8043, and 8044. The data output from each output buffer is transmitted via transmission lines 8051, 8052, 8053, and 8054 to the signal communication apparatus B 802.

The signal communication apparatus B 802 includes input buffer circuits 8061, 8062, 8063, and 8064 for outputting 4-bit data signals Txd1, Txd2, Txd3, and Txd4. It also includes a clock-data signal reproduction circuit section 818 for extracting clock signals from the data signals and for re-digitizing the data signals. The circuit section 818 extracts a reference clock signal from one signal selected from the 4-bit data reception signals, which is used as the basis of the clock signal for re-digitizing each bit, as described in FIG. 1. The circuit section is also capable of switching the bit from which the reference clock signal is extracted to another bit in the event of an abnormality in the reference clock signal extracted bit, so that signal communication can be maintained with the remaining n−1 bits. A data signal monitoring circuit 826 monitors the bit error rate of redigitized 4-bit data signals Tod1, Tod2, Tod3, and Tod4, for example. If the bit error rate exceeds a predetermined tolerance value, such as 10 to 12, the monitoring circuit 826 judges the relevant bit unusable for communication and outputs a data signal abnormality notifying signal ERI containing abnormality information about the data signal. The monitored information is not limited to bit error rate and may be any information relating to the communication quality of the data signals, such as the voltage level, presence or absence of bit error, or the amount of jitter. A data signal bit control circuit 827 determines whether or not each data signal bit is to be used based on the data signal abnormality-notifying signal ERI. It also determines the method of routing the data signals into 4-bit signals. A multiplexer circuit 821 combines the 4-bit data signals Tod1, Tod2, Tod3, and Tod4 in accordance with a multiplexer control signal MC from the data signal bit control circuit 827, and outputs a 1-bit serial data signal DTO. The serial data signal DTO is fed to an internal circuit 810.

The data signal bit control circuit 827 also outputs a bit routing control signal Rxct which is transmitted to a data signal bit control circuit 822 of the signal communication apparatus A 801 via an output buffer circuit 825, a transmission line 824, and an input buffer circuit 823. The data signal bit control circuit 822 outputs a demultiplexer control signal DC in accordance with a bit routing control signal Rict. In the signal communication apparatus according to the fifth embodiment (configuration), the usability of the data signal bits and the method of routing them are determined by the signal communication apparatus B 802, which then sends a bit routing control signal containing these items of information to the signal communication apparatus A 801. Thus, the signal communication apparatuses A 801 and B 802 can communicate signals to one another using a common method of routing data signal bits. Accordingly, the signal communication can be continued by routing the data signals into correct bits in case bit abnormalities develops in some of the data signals.

Figure 9A:
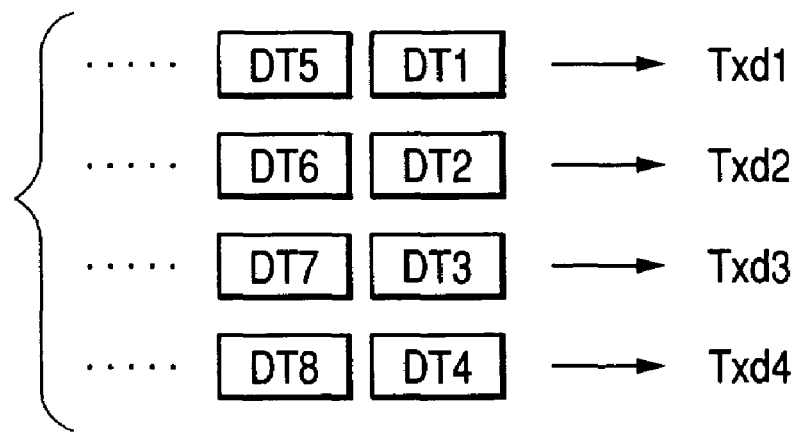
FIG. 9 shows the order of communication of data signals in the event of bit abnormality in the signal communication apparatus shown in FIG. 8.
Figure 9B:
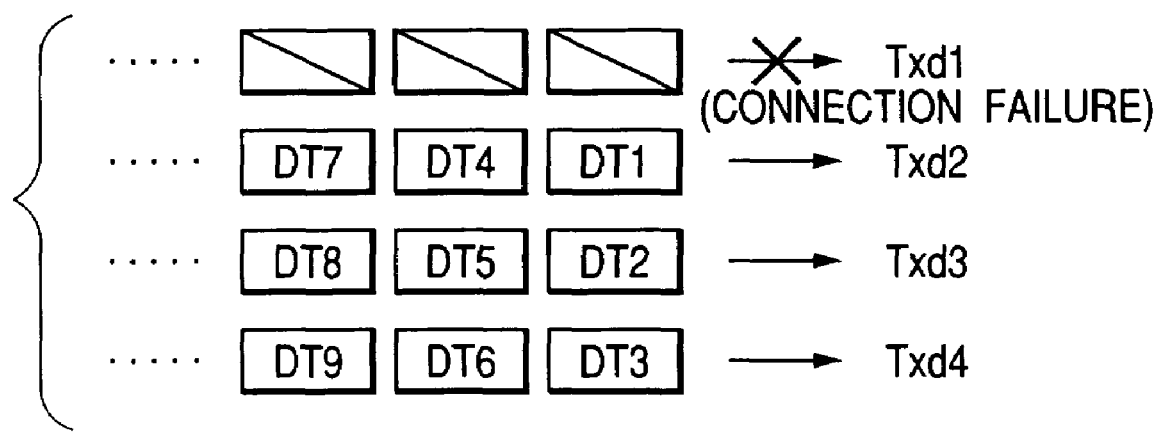

FIGS. 9A and B show the sequence of communication of data signals in the configuration shown in FIG. 8. DT1, DT2, . . . DT8 each indicate one unit of data of the data signal, which is expressed as s-bit, t-byte, or u-packet (where s, t, and u are integers greater than zero), for example. The order of the signal units is expressed as in DT1, DT2, . . . DT9 starting from the first data. FIG. 9A shows the order of communication of data when all of the four bits are normally functioning. The data units are allocated to the 4-bit data signals Txd1, Txd2, Txd3, and Txd4 such that a group of data units DT1, DT2, DT3, and DT4 and another group of data units DT5, DT6, DT7, and DT8 are arranged in parallel. On the other hand, FIG. 9B shows the order of communication of data when an abnormality has developed in data signal Txd1 and communication is being carried out using the three bits of data signals Txd2, Txd3, and Txd4. In this case, as data signal Txd1 cannot be communicated, the data units are allocated to three bits of data signals Txd2, Txd3, and Txd4 such that groups of data units DT1, DT2, and DT3, DT4, DT5, and DT6, and DT7, DT8, and DT9 are arranged in parallel. In the above-described fifth embodiment, the data signal bit for communication between the signal communication apparatuses A 801 and B 802 is four. However, the concept of the invention can be adapted to signal communication apparatuses where the number of bits is n (where n is an integer greater than 1). Further, in the fifth embodiment, the signal DTI prior to routing by the demultiplexer circuit in the transmitting signal communication apparatus is one, and the signal DTO restored by the multiplexer circuit in the receiving signal communication apparatus is also one. However, the concept of the invention can be adapted to general cases where the DTI is p-bit (where p is an integer greater than zero) and the DTO is q (where q is an integer greater than zero).

Figure 10:
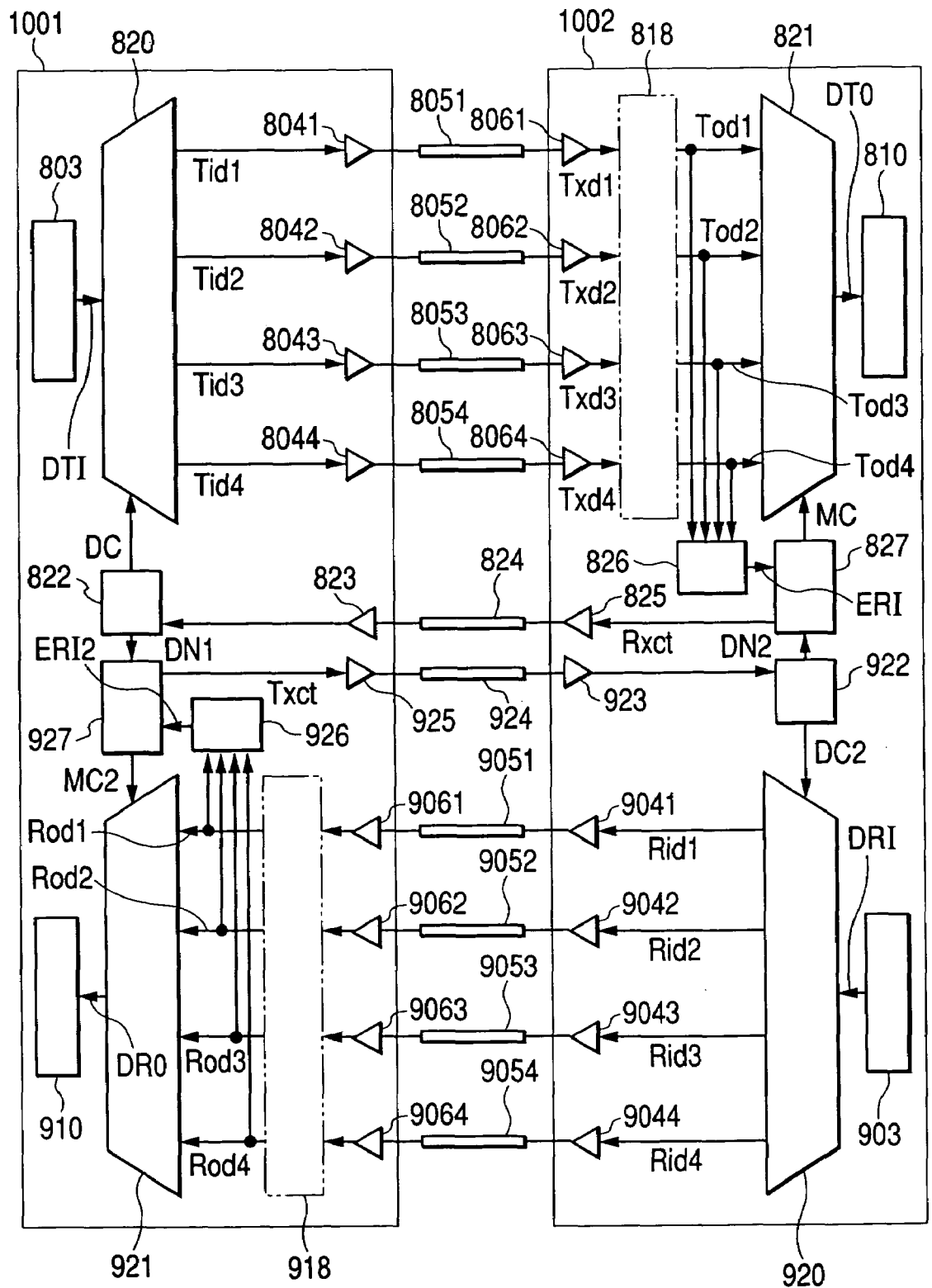
FIG. 10 shows a block diagram of the signal communication apparatus according to a sixth embodiment (configuration) of the invention.

Hereafter, the signal communication apparatus according to a sixth embodiment of the invention will be described. FIG. 10 shows the signal communication apparatus according to the sixth embodiment (configuration), in which each signal communication apparatus comprises a receiver function and a transmitter function. This configuration employs four bits each for transmission and reception. As shown in FIG. 10, the signal communication apparatus according to this embodiment comprises a signal communication apparatus 1001 and a signal communication apparatus 1002. The upper half of the signal communication apparatus 1001 and that of the signal communication apparatus 1002 are portions for the transmission of data from the signal communication apparatus 1001 to the signal communication apparatus 1002. The data transmission in this direction will be conveniently referred to as up-data transmission. This portion for up-data transmission is similarly configured to the fifth configuration shown in FIG. 8. Accordingly, the circuit elements similar to those shown in FIG. 8 are designated by similar reference numerals and their detailed description will be dispensed with.

On the other hand, the lower half of FIG. 10 is a circuit for conducting a "down-data transmission" from the signal communication apparatus 1002 to the signal communication apparatus 1001. This portion is a reversal of the circuit for up-data transmission but is configured in the same manner. Specifically, a serial data signal DRI outputted from an internal circuit 903 of the signal communication apparatus 1002 is converted into 4-bit data signals by a demultiplexer circuit 920, and the individual data signals are delivered onto transmission lines 9051, 9052, 9053, and 9054 via output buffers 9041, 9042, 9043, and 9044. The individual data signals are received by the signal communication apparatus A 1001 via reception buffers 9061, 9062, 9063, and 9064. Clock signals are then extracted and the individual data signals are re-digitalized by a data signal reproduction circuit section 918. Resultant data signals Rod1, Rod2, Rod3, and Rod4 are converted into a serial data signal DRO by a multiplexer circuit 922 and then supplied to an internal circuit 910.

The signal communication apparatus 1001 includes a signal monitoring circuit 926 that monitors the bit error rate of each of the redigitized data signals Rod1, Rod2, Rod3, and Rod4. If there is abnormality, the signal monitoring circuit 926 outputs an abnormality-notifying signal ERI2. Based on the abnormality-notifying signal ERI2, a data routing control circuit 927 makes a decision concerning the switching of the method of routing the data to the individual bits. A routing control signal Txct indicating this decision is transmitted to the signal communication apparatus 1002, from which the data has been received, via a buffer circuit 925 and a transmission line 924. Based on the routing control signal Txct, a data signal bit control circuit 922 of the signal communication apparatus 1002 controls the routing of bits. These points are similar to those in the configuration for up-data transmission.

Further, in the embodiment shown in FIG. 10, where data is transmitted bidirectionally, a bit routing control signal DN1 having information about the manner of routing data for up-data transmission is sent from the data signal bit control circuit 822 on the transmitting end of up-data transmission to the data bit control circuit 927 on the receiving end of down-data transmission. Likewise, a bit routing control signal DN2 having information about the manner of routing data for down-data transmission is sent from the data signal bit control circuit 922 on the transmitting end of down-data transmission to the data bit control circuit 827 on the receiving end of up-data transmission. Thus, when it is necessary to balance the transmission speeds between up- and down-data transmission, the manner of routing data signal bits can be determined based on bit routing control signals DN1 and DN2. When seen in the signal communication apparatus 1001 or the signal communication apparatus 1001, the transmission speed between transmission and reception can be balanced.

FIG. 11 shows the order of data signal communication in the configuration shown in FIG. 10. Numerals DT1, DT2, . . . DT9 each indicate a unit of data for up-data transmission from the signal communication apparatus 1001 to the signal communication apparatus 1002. DR1, DR2, DR3, . . . DR9 each indicate a unit of data for down-data transmission from the signal communication apparatus B 1002 to the signal communication apparatus 1001. The data units are expressed as in s-bit, t-byte, or u-packet, for example (where s, t and u are integers greater than zero). The data units are expressed in the order DT1, DT2, . . . DT9 and DR1, DR2, . . . DR9.

Figure 11A:
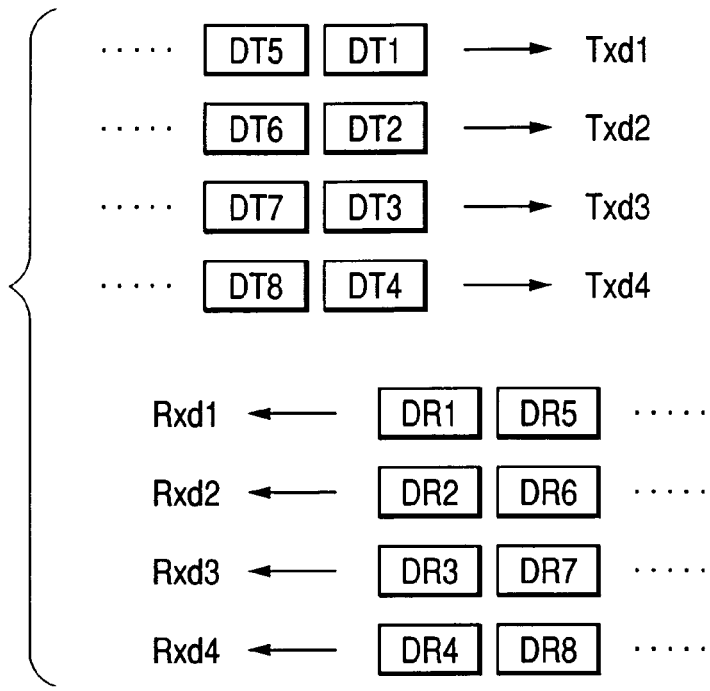
FIG. 11 shows the order of communication of data signals in the event of bit abnormality in the signal communication apparatus shown in FIG. 10.

FIG. 11A shows the order of data communication when all of the bits are normally operating. In up-data transmission, the data units are allocated to 4-bit data signals Txd1, Txd2, Txd3, and Txd4 such that a group of data units DT1, DT2, DT3, and DT4 and another group of data units DT5, DT6, DT7, and DT8 are arranged in parallel. In down-data transmission, the data units are allocated to 4-bit data signals Rxd1, Rxd2, Rxd3, and Rxd4 such that a group of data units DR1, DR2, DR3, and DR4 and another group of data units DR5, DR6, DR7, and DR8 are arranged in parallel.

Figure 11B:
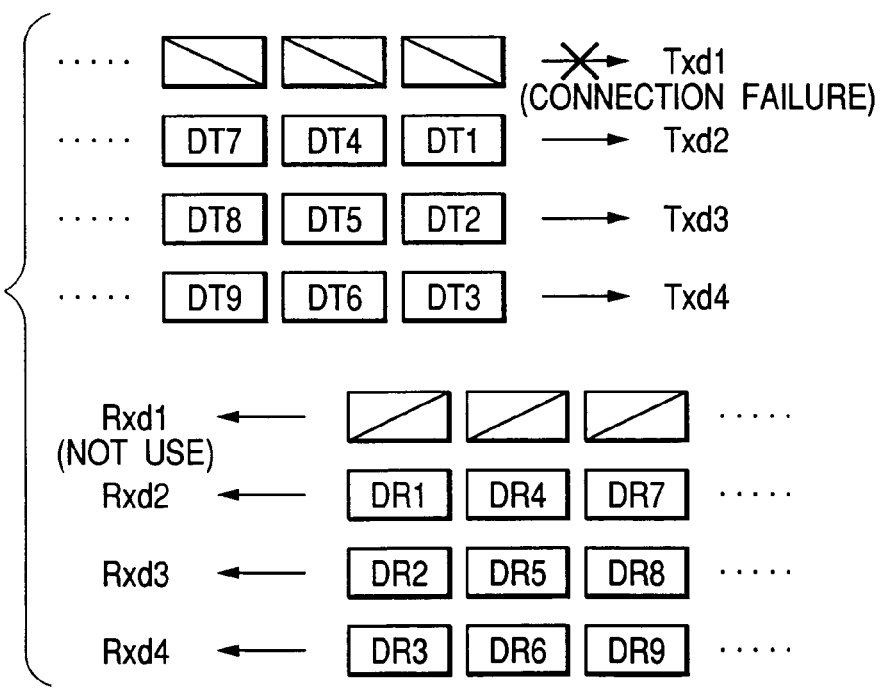

FIG. 11B shows the order of transmission of data when an abnormality has developed in data signal Txd1 in up-data transmission and, as a result, communication is taking place using the three bits of data signals Txd2, Txd3, and Txd4. In this case, because data signal Txd1 cannot be transmitted, as in the case of FIG. 9, communication is conducted by allocating the data units to the 3-bit data signals Txd2, Txd3, and Txd4 such that groups of data units DT1, DT2, and DT3, DT4, DT5, and DT6, and DT7, DT8, and DT9 are arranged in parallel. In this case, while all of the four bits can be transmitted in down-data transmission from the signal communication apparatus 1002 to the signal communication apparatus 1001, it might be necessary to balance the volume of data transmission. If this is the case, down-data transmission can be conducted using three of the four bits. For example, as shown in FIG. 11B, data signals can be transmitted without using the data signal Rxd1 by allocating the data units to the 3-bit data signals Rxd2, Rxd3, and Rxd4 such that a group of data units DR1, DR2, and DR3, another group of data units DR4, DR5, and DR6, and another group DR7, DR8, and DR9 are arranged in parallel.

In the sixth configuration, while data signals are transmitted both in up- and down-data transmission using four bits, the number of data transmission bits is not limited to this. Further, the number of bits of the signals DTI and DRI prior to routing by the demultiplexer circuit in the transmitting signal communication apparatus is not limited to one, and neither is the number of bits of the signals DTO and DRO restored by the multiplexer circuit in the receiving signal communication apparatus. Specifically, the concept of the invention can be adapted to general cases where DTI has p bits, DTO has q bits, DRI has x bits, and DRO has y bits (where p, q, x, and y are integers greater than zero).

Figure 16:
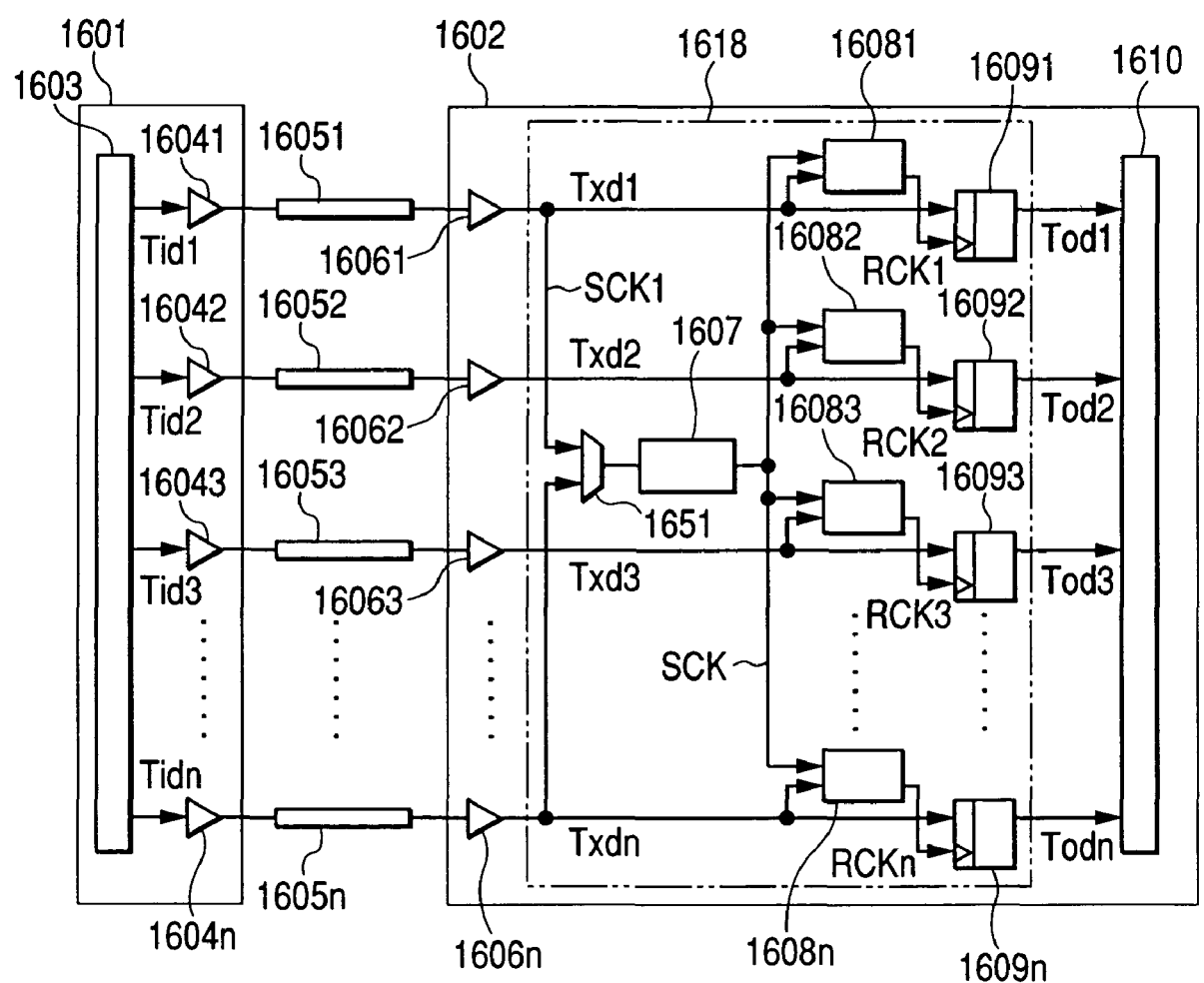
FIG. 16 shows a block diagram of the signal communication apparatus according to a seventh embodiment (configuration) of the invention.

Hereafter the signal communication apparatus according to a seventh embodiment (configuration) of the invention will be described. FIG. 16 shows the signal communication apparatus according to the seventh configuration. As shown, the signal communication apparatus includes a signal communication apparatus 1601 and a signal communication apparatus 1602. The signal communication apparatus 1601 includes an internal circuit 1603 for outputting n-bit data signals Tid1, Tid2, Tid3, . . . Tidn (where n is an integer greater than one), output buffer circuits 16041, 16042, 16043, . . . 1604n, and transmission lines 16051, 16052, 16053, . . . 1605n. The signal communication apparatus 1602 includes input buffer circuits 16061, 16062, 16063, . . . 1606n that output n-bit data signals Txd1, Txd2, Txd3, . . . Txdn, and phase adjusting circuits 16081, 16082, 16083, . . . 1608n that output phase-adjusted reproduction clock signals RCK1, RCK2, RCK3, . . . RCKn for the correct reproduction of data signals. The signal communication apparatus 1602 further includes flip-flop circuits 16091, 16092, 16093, . . . 1609n that output data signals Tod1, Tod2, Tod3, . . . Todn synchronized with the reproduction clock signals, and an internal circuit 1610 to which data signals Tod1, Tod2, Tod3, . . . Todn are fed.

The apparatus according to the seventh embodiment is similar to the basic configuration shown in FIG. 1 except for the circuit for extracting the clock signal in the signal communication apparatus 1602. In FIG. 16, numeral 1618 designates a clock/data signal reproduction circuit section for extracting clock signals from the data signals and for re-digitizing the data signals. The apparatus according to the seventh embodiment includes a data signal selection circuit 1651 for selecting a data signal from 2-bit digital signals Txd1 and Txdn that is to be used for the extraction of clock signal. Thus, a common clock extraction circuit 1607 can be employed. The clock extraction circuit 1607 outputs a reference clock SCK extracted from one of the 2-bit data signals Txd1 and Txdn.

The reference clock SCK is distributed to the phase-adjusting circuits 16081, 16082, 16083, . . . 1608n, as in the basic configuration shown in FIG. 1. In the following, the operation of the apparatus in FIG. 16 in case the data signal from which the reference clock is being extracted has failed will be described. For example, it is now assumed that the data signal selection circuit has selected data signal Txd1 and that reference clock SCK is being extracted from data signal Txd1. In case data signal Txd1 fails, the data signal Txd1 can be switched to Txdn by the data signal selection circuit 1651 so that the reference clock SCK can be extracted therefrom. Thus, data communication can be continued by using bits other than the failed bit Txd1, namely the remaining n−1 bits. In this seventh configuration, the number of bits of the data signals from which clocks can be extracted is two, and the number of reference clock extracted therefrom is one. However, the concept of the invention can be adapted to general cases where the number of bits of the data signals from which clocks can be extracted is a (where a is an integer such that $2 \leq a < n$), and the number of reference clocks extracted is b (where b is an integer such that $1 \leq b \leq a$).

In the signal communication apparatus according to the present embodiment, the number of clock extraction circuits can be decreased, for the clock is extracted from a selected data signal.

Figure 12:
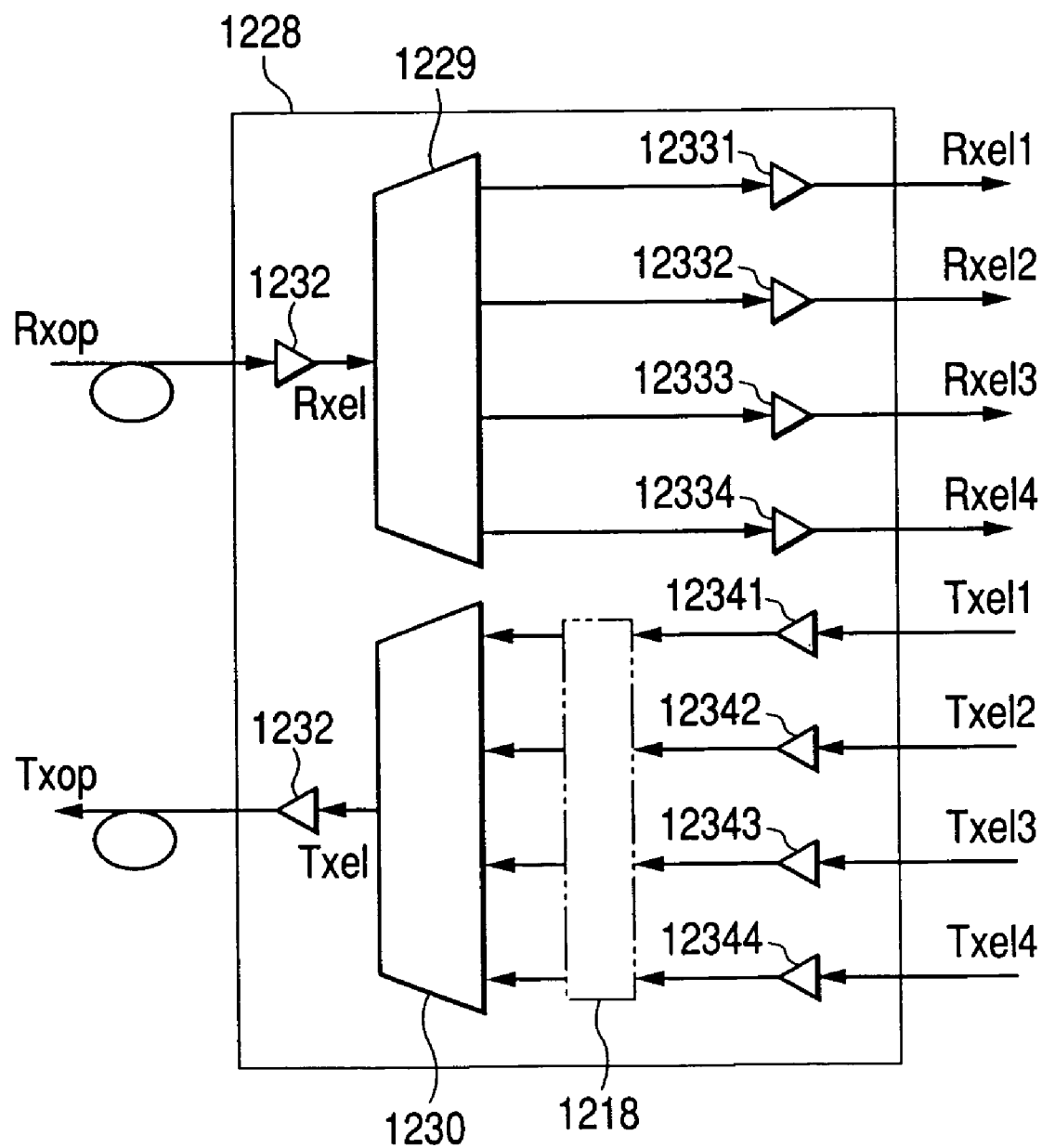
FIG. 12 shows a block diagram of an example of an optical module apparatus having the signal communication apparatus according to the embodiments of the invention.

Hereafter, an example where the signal communication apparatus according to the respective embodiments is applied to an optical module apparatus used for communication between switching systems or servers. FIG. 12 shows a functional block diagram of an optical module apparatus 1228 according to the present example. As shown in FIG. 12, the optical module apparatus converts a 1-bit optical signal into 4-bit electric signals and vice versa for transmission and reception. In the example shown in FIG. 12, the signal transmission in the electric signal section is based on clock signal reproduction. An optical/electric signal conversion circuit section includes an optical reception/photoelectric converter circuit 1231. It receives and converts the 1-bit optical data signal Rxop into the 1-bit electric data signal Rxel. The conversion circuit section also includes a demultiplexer circuit 1229 for converting the 1-bit data signal into 4-bit data signals. The section further includes output buffer circuits 12331, 12332, 12333, and 12334 that output 4-bit electric data signals Rxel1, Rxel2, Rxel3, and Rxel4.

On the other hand, a circuit for converting the electric signal into an optical signal includes input buffer circuits 12341, 12342, 12343, and 12344 to which 4-bit electric data signals Txel1, Txel2, Txel3, and Txel4 are fed. The circuit also includes a clock/data signal reproduction circuit section 1218 for extracting clock signals from the data signals and for re-digitizing the data signals. The circuit section 1218 allows signal communication to continue even if abnormality develops in the data signal of the bit for the extraction of clock signal, as described above, using the remaining bits. Numeral 1230 designates a multiplexer circuit for converting the 4-bit data signals into the 1-bit data signal Txel.

Numeral 1232 designates an electricity-light conversion/optical transmission circuit that converts the 1-bit electric data signal Txel into the 1-bit optical data signal Txop.

In the configuration shown in FIG. 12, the number of bits for the transmission and reception of optical data signals is one, and that for the transmission and reception of electric data signals is 4. However, the concept of the invention can be generally adapted to optical module apparatuses where the number of bits for optical data signal transmission/reception is n (where n is an integer greater than zero), and that for electric data signal transmission/reception is m (where m is an integer greater than zero).

Figure 13:
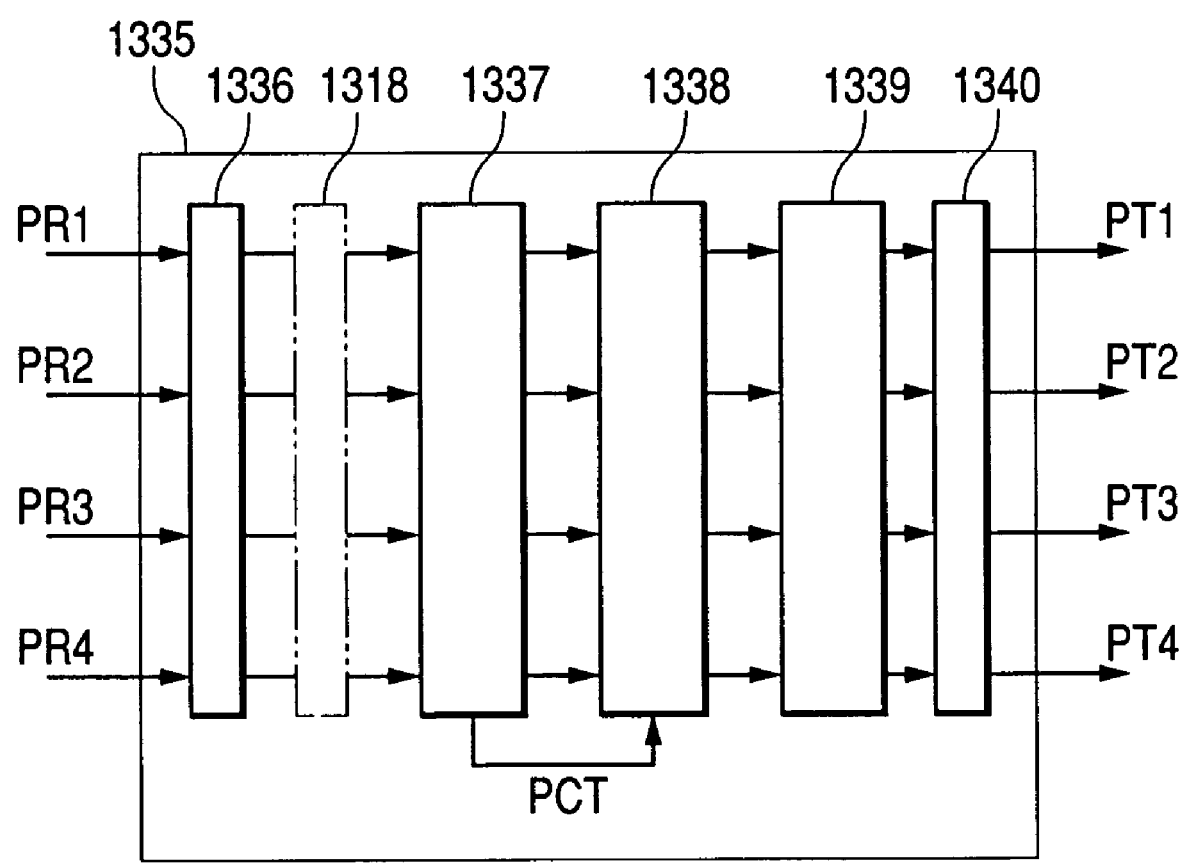
FIG. 13 shows a block diagram of an example of a router apparatus having the signal communication apparatus according to the embodiments of the invention.

Hereafter, an example will be described where the signal communication apparatus according to the above-described embodiments is adapted to a router apparatus used in networks such as the Internet. FIG. 13 shows a router apparatus 1335 with four ports for transmission and reception. The router apparatus 1335 includes a reception circuit 1336 with four ports for packet signals PR1, PR2, PR3, and PR4. It also includes a clock/data signal reproduction circuit section 1318 for extracting clock signals from data signals and for redigitizing data signals. The circuit section 1318 allows signal communication to be maintained in case an abnormality develops in the data signal of the bit from which the clock signal is to be extracted, using the remaining bits. A reception packet signal control circuit 1337 identifies the reception packet signals and then outputs a path control signal PCT. A switch circuit 1338 connects a reception port to which a packet signal has entered to one of the transmission ports PT1, PT2, PT3, and PT4, according to the path control signal PCT. A transmission packet signal control circuit 1339 controls the transmission timing of transmit packet signals, for example. A packet signal transmission circuit 1340 outputs the transmit packet signals to the individual transmission ports PT1, PT2, PT3, and PT4. While in the configuration shown in FIG. 13 the number of input/output ports is four, the concept of the invention can be generally adapted to routers where the number of input/output ports is n (where n is an integer greater than zero).

As described above, in the multibit signal communication apparatus of the clock signal reproduction transmission type according to the invention, in which clock signals are extracted from received data signals for redigitization of the data signals, in case the bit of the data signal from which the clock signal is extracted is defective, data communication can be continued using the remaining correctly operating bits. All of the remaining bits other than the defective bit can be utilized, so that the lowering of signal transmission speeds during failure can be minimized.

Because the invention only requires a minimum of two clock signal reproduction circuits for extracting clock signals from the data signals, the space required by a multibit signal communication circuit with the clock signal reproduction circuits, which are relatively large, can be minimized when mounted on an LSI chip. Thus, the area of the LSI chip as well as its cost can be minimized.

The clock signal reproduction circuit can become a source of noise and is susceptible thereto. Mounting a number of them on a single LSI chip would be difficult from the viewpoint of LSI development and would result in higher design cost. In accordance with the invention, however, the number of the clock signal reproduction circuits can be minimized, so that noise can be reduced and the cost of designing the necessary LSI can also be reduced.

While the invention has been described by way of various embodiments, it should be obvious to persons skilled in the art that various modifications, variations or combinations can be made without departing from the scope of the invention.

As described above, in the multibit signal communication apparatus of the clock signal reproduction transmission type according to the invention, in which clock signals are extracted from received data signals for redigitization of the data signals, in case the bit of the data signal from which the clock signal is extracted is defective, data communication can be continued using the remaining correctly operating bits. All of the remaining bits other than the defective bit can be utilized, so that the lowering of signal transmission speeds during failure can be minimized.

As the number of the clock signal reproduction circuits can be decreased, the chip area as well as cost can be reduced.

What is claimed is:

1. A signal communication apparatus of the clock reproduction transmission type in which communication is conducted using parallel optical or electric signals, the apparatus comprising a data signal reception section for receiving data signals that have been transmitted, wherein the data signal reception section comprises:

a number a of clock signal extraction circuits, each of which extracting a clock signal from each of a-bit data signals in n-bit parallel data signals that have been received, where a is an integer such that $2 \leq a < n$;

a clock signal selection circuit for selecting a single clock signal from the extracted a clock signals, the single clock signal being designated as a reference clock signal;

a number n of phase adjusting circuits for adjusting the phase of the selected reference clock signal to produce reproduction clock signals for the received n-bit parallel data signals, each reproduction clock signal providing a timing of redigitization of each of the received n-bit parallel data signals; and sampling means for redigitizing each of received n-bit parallel data signals in accordance with the timing provided by the reproduction clock signal for each bit.

2. The signal communication apparatus according to claim 1, further comprising an input terminal for a selection signal for changing the selection of the single clock signal in the clock signal selection circuit.

3. The signal communication apparatus according to claim 1, further comprising a clock signal monitoring circuit that monitors the voltage level or frequency of the selected reference clock signal or the clock signals extracted from the data signals and which, if it detects abnormality in the voltage level or frequency, outputs a control signal for switching the reference clock signal to a normal clock signal extracted from a different data signal bit.

4. The signal communication apparatus according to claim 3, further comprising an alarm means for indicating the occurrence of an abnormality in the event of detection of an abnormality by the clock signal monitoring circuit.

5. The signal communication apparatus according to claim 1, further comprising a data signal monitoring circuit that monitors at least one kind of information about the communication quality of the data signal from which the reference clock signal is to be extracted, the information being selected from the group consisting of voltage level, rise and fall edges, presence or absence of bit error, bit error ratio, and the amount of jitter.

6. The signal communication apparatus according to claim 5, further comprising an alarm means for notifying the occurrence of an abnormality in the event that the data signal monitoring circuit detects an abnormality.

7. The signal communication apparatus according to claim 1, further comprising a data signal monitoring circuit that monitors at least one kind of information about the communication quality of the redigitized n-bit data signals, the information being selected from the group consisting of voltage level, presence or absence of bit error, bit error ratio, and the amount of jitter, wherein, if the information about the communication quality exceeds a predetermined tolerance value, the monitoring circuit deems the relevant bit unfit for communication and produces a data signal abnormality notifying signal.

8. The signal communication apparatus according to claim 1, wherein the clock signal selection circuit is provided for each of a blocks of the received n-bit parallel data signals, and each output of the clock signal selection circuit for each block is distributed to phase adjusting circuits in the block as a reference clock signal for the block, wherein said clock signal selection circuit includes circuit for switching the selection of the reference clock signal for a block, in case where a clock signal extraction circuit for the block cannot correctly extract a clock signal, to select another reference clock signal extracted in another block.

9. A signal communication system of the clock reproduction transmission type in which communication is conducted using parallel optical or electric signals, the system comprising:

a data signal transmission section for transmitting parallel data signals; and a data signal reception section for receiving the parallel data signals that have been transmitted, wherein the data signal reception section comprises:

a clock signal extraction/selection circuit for selecting a number b of bits from a number a of bits in n-bit data signals that have been received, where a is an integer such that $2 \leq a < n$, and b is such an integer that $1 \leq b < a$, the clock signal extraction/selection circuit extracting a clock signal from the selected data signal and outputting it as a reference clock signal;

a number n of phase adjusting circuits for adjusting the phase of the reference clock signal to generate a reproduction clock signal for each bit, the reproduction clock signal providing the timing of redigitizing each of the n-bit data signals that have been received;

a sampling means for redigitizing each of the received n-bit data signals using the timing provided by the reproduction clock signal for each bit;

a monitoring means for monitoring each of the n-bit data signals obtained from the sampling means in terms of whether or not the data is normal; and a data signal bit control circuit that determines the usability of the n-bit data signals in accordance with the output of the monitoring means, produces a routing control signal for routing a row of data only to normally operable data signal bits, and transmits the routing control signal to the data signal transmission section, and wherein the data signal transmission section comprises:

an input circuit for receiving the bit routing control signal transmitted from the data signal bit control circuit in the data signal reception section; and a routing circuit for routing a row of data to be transmitted to the normally operable data signal bits in accordance with the bit routing control signal.

10. The signal communication system according to claim 9, wherein the routing of a number c of bits of data to the remaining n-c bits that are operable (where c and n are integers such that $1 \leq c < n$) is conducted on a bit by bit basis, k-bit basis, or packet data basis.

11. A signal communication apparatus of the clock reproduction transmission type whereby communication is conducted using parallel optical or electrical signals, the apparatus comprising a data signal reception unit for receiving transmitted data signals, said data signal reception unit comprising:

a clock signal extraction/selection circuit for extracting clock signals from a-bit data signals in n-bit parallel data signals that have been received, where a is an integer such that $2 \leq a < n$, and outputting the extracted clock signal as a reference clock signal;

a number n of phase adjusting circuits for adjusting the phase of extract clock signals and thereby producing reproduction clock signals for the received n-bit data signals, each of the reproduction clock signals providing a timing of redigitization of each data signal; and sampling means for redigitizing each of the received n-bit data signals in accordance with the timing provided by the reproduction clock signal for each bit, wherein the clock signal extraction/selection circuit comprises:

a voltage controlled oscillator;

a number a of phase comparators respectively comparing the phase of each of the a-bit data signals with that of output signal of each of said voltage controlled oscillators;

a selector for selecting one output from comparison outputs of said phase comparators; and a loop filter for connecting the selected comparison output to said voltage controlled oscillator.

* * * * *